US007003542B2

(12) United States Patent
Devir

(10) Patent No.: US 7,003,542 B2
(45) Date of Patent: Feb. 21, 2006

(54) APPARATUS AND METHOD FOR INVERTING A 4×4 MATRIX

(75) Inventor: Zvi Devir, Haifa (IL)

(73) Assignee: Intel Corporation, Santa Clara, CA (US)

( * ) Notice: Subject to any disclaimer, the term of this patent is extended or adjusted under 35 U.S.C. 154(b) by 653 days.

(21) Appl. No.: 10/038,395

(22) Filed: Jan. 2, 2002

(65) Prior Publication Data

US 2003/0126176 A1 Jul. 3, 2003

(51) Int. Cl.
*G06F 7/32* (2006.01)

(52) U.S. Cl. ...................................................... 708/520

(58) Field of Classification Search ................. 708/520
See application file for complete search history.

(56) References Cited

U.S. PATENT DOCUMENTS 5,557,511 A * 9/1996 Bayard ........................ 700/37

6,748,098 B1 * 6/2004 Rosenfeld ................... 382/131

* cited by examiner

*Primary Examiner*—Tan V. Mai
(74) *Attorney, Agent, or Firm*—Blakely, Sokoloff, Taylor & Zafman LLP

(57) ABSTRACT

An apparatus and method for inverting a 4×4 source matrix. A source matrix is divided into four 2×2 sub-matrices. A plurality of sub-matrix products are subsequently calculated from the sub-matrices. Next, a determinant of the source matrix is calculated to form a determinant residue utilizing the previously computed sub-matrix products. Calculation of partial inverse for each sub-matrix is next performed, using the sub-matrix products and determinants of the sub-matrices. Finally, an inverse of each sub-matrix is calculated, utilizing the partial inverse sub-matrices and the determinant residue to form an inverse of the 4×4 source matrix. The article allows processors to store two floating-point elements within a Single Instruction Multiple Data (SIMD) register. Accordingly, a sub-matrix is represented using two SIMD registers, resulting in improved computational locality and efficiency. Other embodiments are described and claimed.

33 Claims, 21 Drawing Sheets

$$S=\begin{bmatrix} S_{11} & S_{12} & S_{13} & S_{14} \\ S_{21} & S_{22} & S_{23} & S_{24} \\ S_{31} & S_{32} & S_{33} & S_{34} \\ S_{41} & S_{42} & S_{43} & S_{44} \end{bmatrix} = \left[\begin{array}{c|c} A & B \\ \hline C & D \end{array}\right]$$

SOURCE MATRIX 300

FIG. 4A MATRIX SUBDIVISION $$A=\begin{bmatrix} S_{11} & S_{12} \\ S_{21} & S_{22} \end{bmatrix} = \begin{bmatrix} A_{11} & A_{12} \\ A_{21} & A_{22} \end{bmatrix}$$

SUB-MATRIX A - 310

$$B=\begin{bmatrix} S_{13} & S_{14} \\ S_{23} & S_{24} \end{bmatrix} = \begin{bmatrix} B_{11} & B_{12} \\ B_{21} & B_{22} \end{bmatrix}$$

SUB-MATRIX C - 320

$$C=\begin{bmatrix} S_{31} & S_{32} \\ S_{41} & S_{42} \end{bmatrix} = \begin{bmatrix} C_{11} & C_{12} \\ C_{21} & C_{22} \end{bmatrix}$$

SUB-MATRIX C - 330

$$D=\begin{bmatrix} S_{33} & S_{34} \\ S_{43} & S_{44} \end{bmatrix} = \begin{bmatrix} D_{11} & D_{12} \\ D_{21} & D_{22} \end{bmatrix}$$

SUB-MATRIX D - 340

FIG. 4B

312 $A.V_1 = [A_{11}, A_{12}]$
314 $A.V_2 = [A_{21}, A_{22}]$
SUB-MATRIX A ROWS

322 $B.V_1 = [B_{11}, B_{12}]$
324 $B.V_2 = [B_{21}, B_{22}]$
SUB-MATRIX B ROWS

332 $C.V_1 = [C_{11}, C_{12}]$
334 $C.V_2 = [C_{21}, C_{22}]$
SUB-MATRIX C ROWS

342 $D.V_1 = [D_{11}, D_{12}]$
344 $D.V_2 = [D_{21}, D_{22}]$
SUB-MATRIX D ROWS

FIG. 4C SUB-MATRIX ROW REPRESENTATION

APPARATUS AND METHOD FOR INVERTING A 4×4 MATRIX

FIELD OF THE INVENTION

The invention relates generally to the field of three-dimensional graphic transformation. More particularly, the invention relates to a method and apparatus for inverting a 4×4 matrix within machines capable of performing Single Instruction Multiple Data (SIMD) calculations.

BACKGROUND OF THE INVENTION

Media applications have been driving microprocessor development for more than a decade. In fact, most computing upgrades in recent years have been driven by media applications, predominantly within consumer segments, but also in enterprise segments for entertainment, enhanced education and communication purposes. Nevertheless, future media applications will require even higher computational requirements. As a result, tomorrow's personal computing (PC) experiences will be even richer in audio/visual effects, as well as being easier to use and more importantly, computing will merge with communications.

Accordingly, the display of images, as well as playback of audio and video, have become increasingly popular for current computing devices. Unfortunately, the quantity of data required for these types of applications tends to be very large. As a result, increases in computational power, memory and disk storage, as well as network bandwidth have facilitated the creation and use of larger and higher quality images. Unfortunately, the use of larger and higher quality images often results in a bottleneck between the processor and memory, as well as requiring intensive computational requirements.

One such media application, which is driving microprocessor development, is three-dimensional (3D) graphics. Specifically, 3D graphics applications provide user users of such systems with enhanced displays, which come close to imitating the clarity provided by real life objects. Unfortunately, 3D graphic systems require intensive computational requirements required for translating objects and coordinates between the various coordinate systems. In fact, transforming a point from one coordinate system to another is one of the most common operations in 3D graphics.

To accomplish transformation of a point from one coordinate system to another in one operation, a 3D point is treated as a four-dimensional (4D) vector [x, y, z, w]. Accordingly, the 3D point may be represented as a 4D vector such that the 3D point is now represented by a homogenous coordinate [x/w, y/w, z/w]. Utilizing such representation, transforming or transferring a point from one coordinate system to another is often accomplished by multiplying the 4D vector by a 4×4 matrix. As a result, the 4×4 matrix represents the transformations, such as scaling, rotation and translation between the two coordinate systems.

Accordingly, a typical 3D pipeline transforms an object from the coordinate system it was created in (objects space) to the world coordinate system (world space) and then to the viewer coordinate system (view space). However, it is quite common that a value defined in the world or view space may require conversion back to its originally created object space. As an example, lights are defined in the world space and are often transformed back to the object space in order to perform light intensity calculations. Generally, this conversion back to the object space is performed by the operation of 4×4 matrix inversion.

Unfortunately, the calculation of a matrix inverse is one of the heaviest operations on matrices. The standard way to calculate an inverse of a matrix is by using a method called "Gaussian Elimination". However, for small matrices, it is usually more efficient to calculate the inverse by scaling the adjoint matrix by the matrix's determinant residue. Accordingly, scaling the adjoint matrix is the most commonly used implementations by conventional 3D graphic systems.

One of the modern techniques to accelerate numerical calculations is to use Single Instruction Multiple Data (SIMD) algorithms, where each operation is taken over a vector of a few data elements. Unfortunately, the calculation of the adjoint matrix is not easily converted into a SIMD algorithm, as each element in the adjoint matrix is a function of nine of the elements of the source matrix (actually, the determinant of a 3×3 sub-matrix). Furthermore, the calculation over those elements is not easily vectorized. Even when the calculation is vectorized, usually there are not enough registers within the architecture to contain all of the intermediate results.

Therefore, there remains a need to overcome one or more of the limitations in the above-described existing.

BRIEF DESCRIPTION OF THE DRAWINGS

The present invention is illustrated by way of example, and not by way of limitation, in the figures of the accompanying drawings and in which:

FIGS. 4A and 4B depict matrix sub-divisions of a source matrix in accordance with one embodiment of the present invention.

FIG. 4C depicts a vector representation of the various sub-matrices, as depicted in FIGS. 4A and 4B, in accordance with a further embodiment of the present invention.

DETAILED DESCRIPTION

Figure 1:
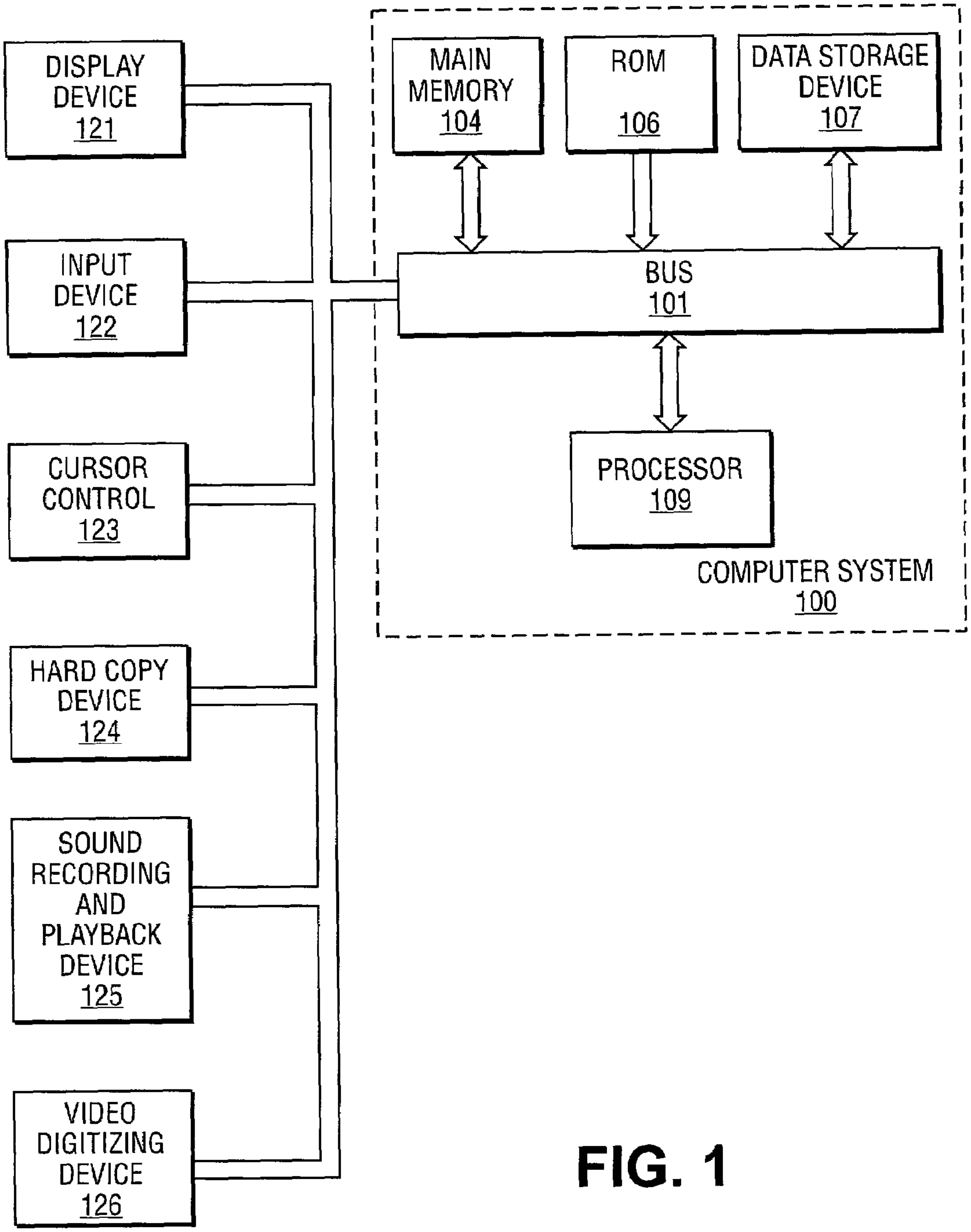
FIG. 1 depicts a block diagram illustrating a computer system capable of implementing one embodiment of the present invention.

A method and apparatus for inverting a 4×4 matrix are described. In one embodiment, the method includes five stages. During a first stage, a source matrix is divided into four 2×2 sub-matrices. Once sub-divided, a plurality of sub-matrix products are calculated from the four 2×2 sub-matrices. Next, a determinant source matrix is calculated to form a determinant residue (rd) utilizing one or more of the previously computed plurality of sub-matrix products. A calculation of partial inverse for each sub-matrix is next performed, using the one or more of the sub-matrix products. Finally, an inverse of each sub-matrix is calculated, utilizing the partial inverse sub-matrices and determinant reside rd to form an inverse of the 4×4 source matrix.

In the following description, for the purposes of explanation, numerous specific details are set forth in order to provide a thorough understanding of the present invention. It will be apparent, however, to one skilled in the art that the present invention may be practiced without some of these specific details. In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention. In other instances, well-known structures and devices are shown in block diagram form in order to avoid obscuring the details of the present invention.

Portions of the following detailed description may be presented in terms of algorithms and symbolic representations of operations on data bits. These algorithmic descriptions and representations are used by those skilled in the data processing arts to convey the substance of their work to others skilled in the art. An algorithm, as described herein, refers to a self-consistent sequence of acts leading to a desired result. The acts are those requiring physical manipulations of physical quantities. These quantities may take the form of electrical or magnetic signals capable of being stored, transferred, combined, compared, and otherwise manipulated. Moreover, principally for reasons of common usage, these signals are referred to as bits, values, elements, symbols, characters, terms, numbers, or the like.

However, these and similar terms are to be associated with the appropriate physical quantities and are merely convenient labels applied to these quantities. Unless specifically stated otherwise, it is appreciated that discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's devices into other data similarly represented as physical quantities within the computer system devices such as memories, registers or other such information storage, transmission, display devices, or the like.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software.

One of skill in the art will immediately appreciate that the invention can be practiced with computer system configurations other than those described below, including handheld devices, multiprocessor systems, microprocessor-based or programmable consumer electronics, digital signal processing (DSP) devices, network PCs, minicomputers, mainframe computers, and the like. The invention can also be practiced in distributed computing environments where tasks are performed by remote processing devices that are linked through a communications network. The required structure for a variety of these systems will appear from the description below.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression.

Thus, one skilled in the art would recognize a block denoting "C=A+B" as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

In an embodiment, the methods of the present invention are embodied in machine-executable instructions. The instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

In one embodiment, the present invention may be provided as a computer program product which may include a machine or computer-readable medium having stored thereon instructions which may be used to program a computer (or other electronic devices) to perform a process according to the present invention. Accordingly, the computer-readable medium includes any type of media/machine-readable medium suitable for storing electronic instructions. Moreover, the present invention may also be downloaded as a computer program product. As such, the program may be transferred from a remote computer (e.g., a server) to a requesting computer (e.g., a client). The transfer of the program may be by way of data signals embodied in a carrier wave or other propagation medium via a communication link (e.g., a modem, network connection or the like).

System

Referring to FIG. 1, a computer system upon which an embodiment of the present invention can be implemented in shown as computer system 100. Computer system 100 comprises a bus 101, or other communications hardware and software, for communicating information, and a processor 109 coupled with bus 101 for processing information. Computer system 100 further comprises a random access memory (RAM) or other dynamic storage device (referred to as main memory 104), coupled to bus 101 for storing information and instructions to be executed by processor 109. Main memory 104 also may be used for storing temporary variables or other intermediate information during execution of instructions by processor 109. Computer system 100 also comprises a read only memory (ROM) 106, and/or other static storage device, coupled to bus 101 for storing static information and instructions for processor 109. Data storage device 107 is coupled to bus 101 for storing information and instructions.

Furthermore, a data storage device 107, such as a magnetic disk or optical disk, and its corresponding disk drive, can be coupled to computer system 100. Computer system 100 can also be coupled via bus 101 to a display device 121 for displaying information to a computer user. Display device 121 can include a frame buffer, specialized graphics rendering devices, a cathode ray tube (CRT), and/or a flat panel display. An alphanumeric input device 122, including alphanumeric and other keys, is typically coupled to bus 101 for communicating information and command selections to processor 109.

Another type of user input device is cursor control 123, such as a mouse, a trackball, a pen, a touch screen, or cursor direction keys for communicating direction information and command selections to processor 109, and for controlling cursor movement on display device 121. This input device typically has two degrees of freedom in two axes, a first axis (e.g., x) and a second axis (e.g., y), which allows the device to specify positions in a plane. However, this invention should not be limited to input devices with only two degrees of freedom.

Another device which may be coupled to bus 101 is a hard copy device 124 which may be used for printing instructions, data, or other information on a medium such as paper, film, or similar types of media. Additionally, computer system 100 can be coupled to a device for sound recording, and/or playback 125, such as an audio digitizer coupled to a microphone for recording information. Further, the device may include a speaker which is coupled to a digital to analog (D/A) converter for playing back the digitized sounds.

Also, computer system 100 can be a terminal in a computer network (e.g., a LAN). Computer system 100 would then be a computer subsystem of a computer system including a number of networked devices. Computer system 100 optionally includes video digitizing device 126. Video digitizing device 126 can be used to capture video images that can be transmitted to others on the computer network.

Computer system 100 is useful for supporting computer supported cooperation (CSC—the integration of teleconferencing with mixed media data manipulation), 2D/3D graphics, image processing, video compression/decompression, recognition algorithms and audio manipulation.

Processor

Figure 2:
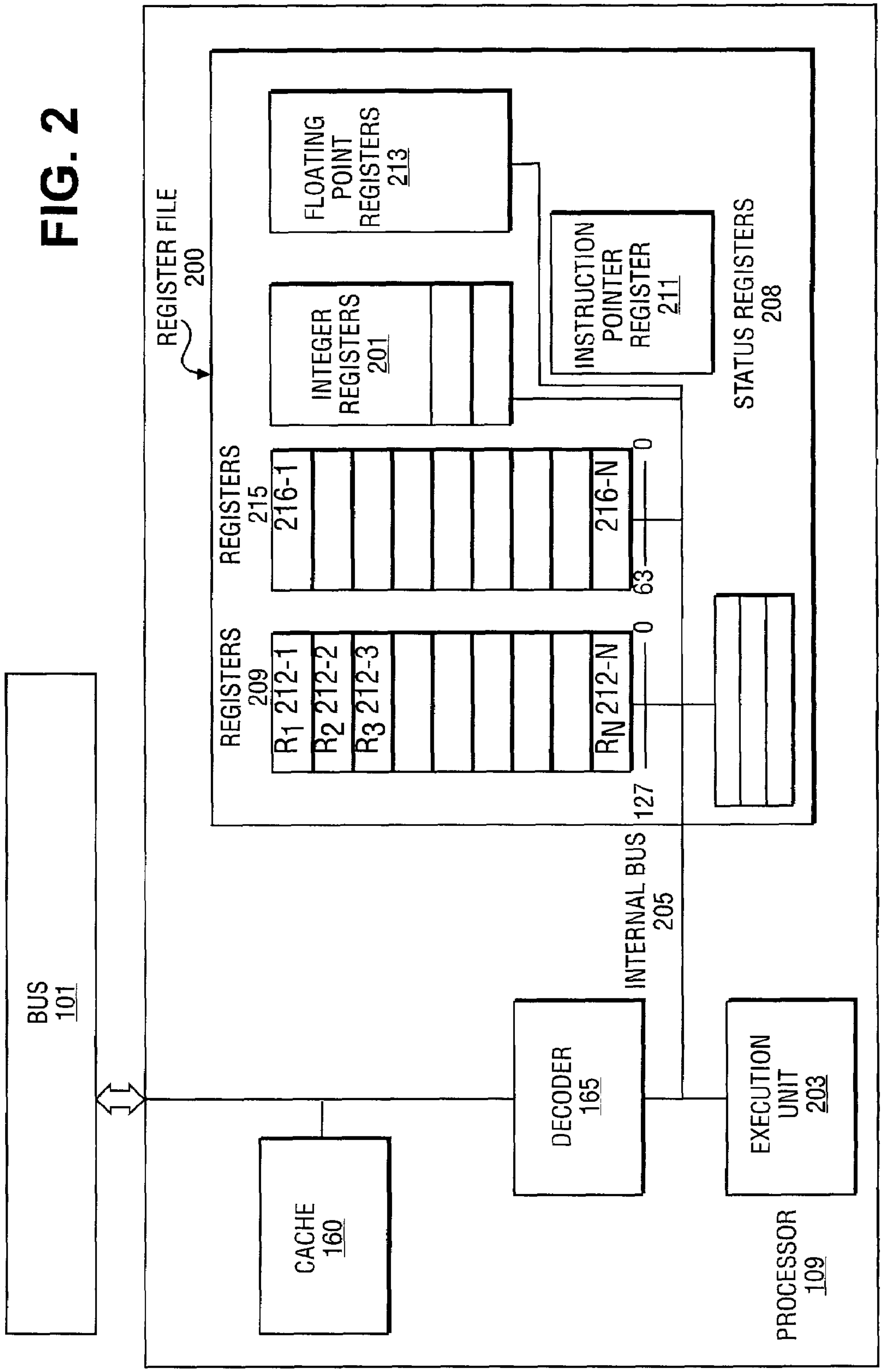
FIG. 2 depicts a block diagram illustrating an embodiment of the processor as depicted in FIG. 1 in accordance with the further embodiment of the present invention.

FIG. 2 illustrates a detailed diagram of processor 109. Processor 109 comprises a decoder 202 for decoding control signals and data used by processor 109. Data can then be stored in register file 200 via internal bus 205. As a matter of clarity, the registers of an embodiment should not be limited in meaning to a particular type of circuit. Rather, a register of an embodiment need only be capable of storing and providing data, and performing the functions described herein.

Depending on the type of data, the data may be stored in integer registers 201, registers 209, registers 215, floating point registers 213, status registers 208, or instruction pointer register 211. In one embodiment, integer registers 201 store thirty-two bit integer data. In one embodiment, registers 209 contains eight multimedia registers, $R_1$212-1 through $R_8$212-8, for example, single instruction, multiple data (SIMD) registers containing packed floating point data. Each register in registers 209 is one hundred twenty-eight bits in length. R1 212-1, R2 212-2 and R3 212-3 are examples of individual registers in registers 209.

In one embodiment, registers 215 contains eight multimedia registers, $R_1$216-1 through $R_8$216-8, for example, single instruction multiple data (SIMD) registers containing packed floating point data. Each register in registers 215 is sixty-four bits in length. R1 216-1, R2 216-2 and R3 216-3 are examples of individual registers in registers 215. Status registers 208 indicate the status of processor 109. Instruction pointer register 211 stores the address of the next instruction to be executed. Integer registers 201, registers 209, status registers 208, and instruction pointer register 211 all connect to internal bus 205. Any additional registers would also connect to the internal bus 205.

In another embodiment, some of these registers can be used for different types of data. For example, registers 209 and integer registers 201 can be combined where each register can store either integer data or packed data. In another embodiment, registers 209 can be used as floating point registers. In this embodiment, packed data or floating point data can be stored in registers 209. In one embodiment, the combined registers are one hundred twenty-eight bits in length and integers are represented as one hundred twenty-eight bits. In this embodiment, in storing packed data and integer data, the registers do not need to differentiate between the two data types.

Functional unit 203 performs the operations carried out by processor 109. Such operations may include shifts, addition, subtraction and multiplication, etc. Functional unit 203 connects to internal bus 205. Cache 206 is an optional element of processor 109 and can be used to cache data and/or control signals from, for example, main memory 104. Cache 206 is connected to decoder 202, and is connected to receive control signal 207.

Data and Storage Formats

Figure 3A:
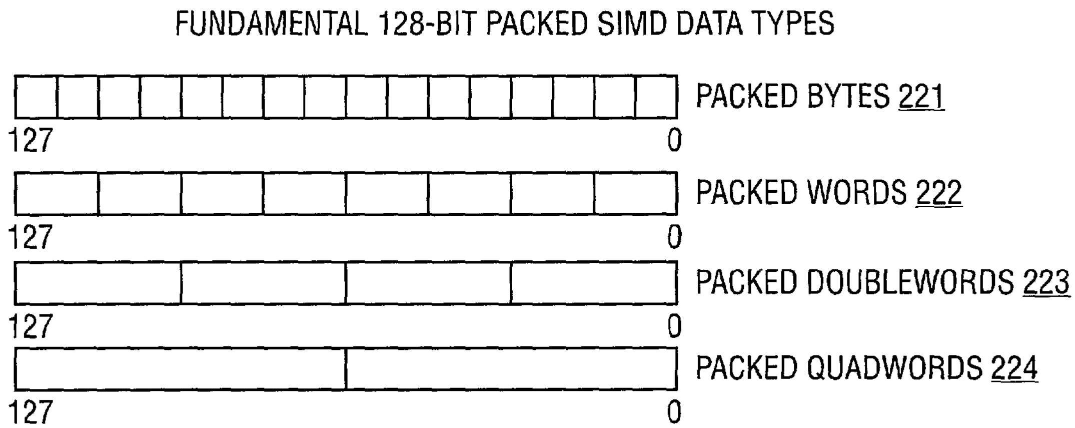
FIGS. 3A–3D depict block diagrams illustrating 128-bit and 64-bit packed single instruction multiple data, data types according to a further embodiment of the present invention.
Figure 3B:
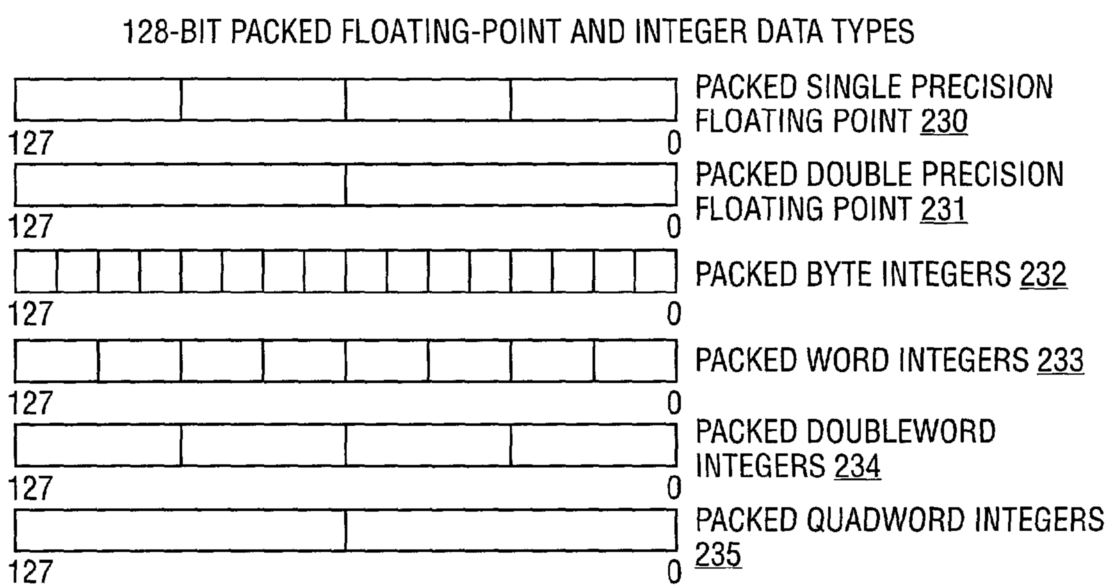

Referring now to FIGS. 3A and 3B, FIGS. 3A and 3B illustrate 128-bit SIMD data type according to one embodiment of the present invention. FIG. 3A illustrates four 128-bit packed data-types: packed byte 221, packed word 222, packed doubleword (dword) 223 and packed quadword 224. Packed byte 221 is one hundred twenty-eight bits long containing sixteen packed byte data elements. Generally, a data element is an individual piece of data that is stored in a single register (or memory location) with other data elements of the same length. In packed data sequences, the number of data elements stored in a register is one hundred twenty-eight bits divided by the length in bits of a data element.

Packed word 222 is one hundred twenty-eight bits long and contains eight packed word data elements. Each packed word contains sixteen bits of information. Packed doubleword 223 is one hundred twenty-eight bits long and contains four packed doubleword data elements. Each packed doubleword data element contains thirty-two bits of information. A packed quadword 224 is one hundred twenty-eight bits long and contains two packed quad-word data elements. Thus, all available bits are used in the register. As a result, this storage arrangement increases the storage efficiency of the processor. Moreover, with multiple data elements accessed simultaneously, one operation can now be performed on multiple data elements simultaneously.

FIG. 3B illustrates 128-bit packed floating-point and Integer Data types according to one embodiment of the invention. Packed single precision floating-point 230 illustrates the storage of four 32-bit floating point values in one of the SIMD registers 209, as shown in FIG. 2. Packed double precision floating-point 231 illustrates the storage of two 64-bit floating-point values in one of the SIMD registers 209 as depicted in FIG. 2. As will be described in further detail below, packed double precision floating-point 231 may be utilized to store two element vectors of a 2×2 sub-matrix.

Accordingly, an entire sub-matrix may be stored utilizing two 128-bit registers, each containing two vector elements which are stored in packed double precision floating-point format. Packed byte integers 232 illustrate the storage of 16 packed integers, while packed word integers 233 illustrate the storage of 8 packed words. Finally, packed doubleword integers 234 illustrate the storage of four packed doublewords, while packed quadword integers 235 illustrate the storage of two packed quadword integers within a 128-bit register, for example as depicted in FIG. 2.

Figure 3C:
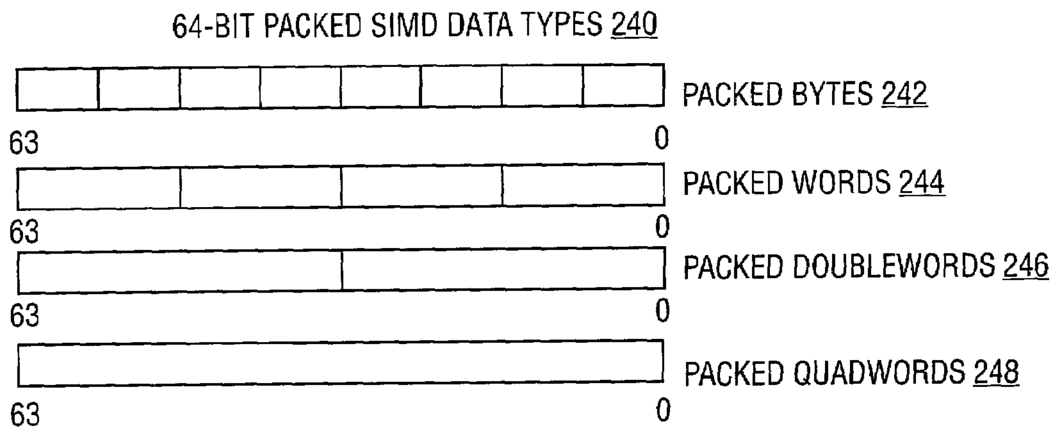
Figure 3D:
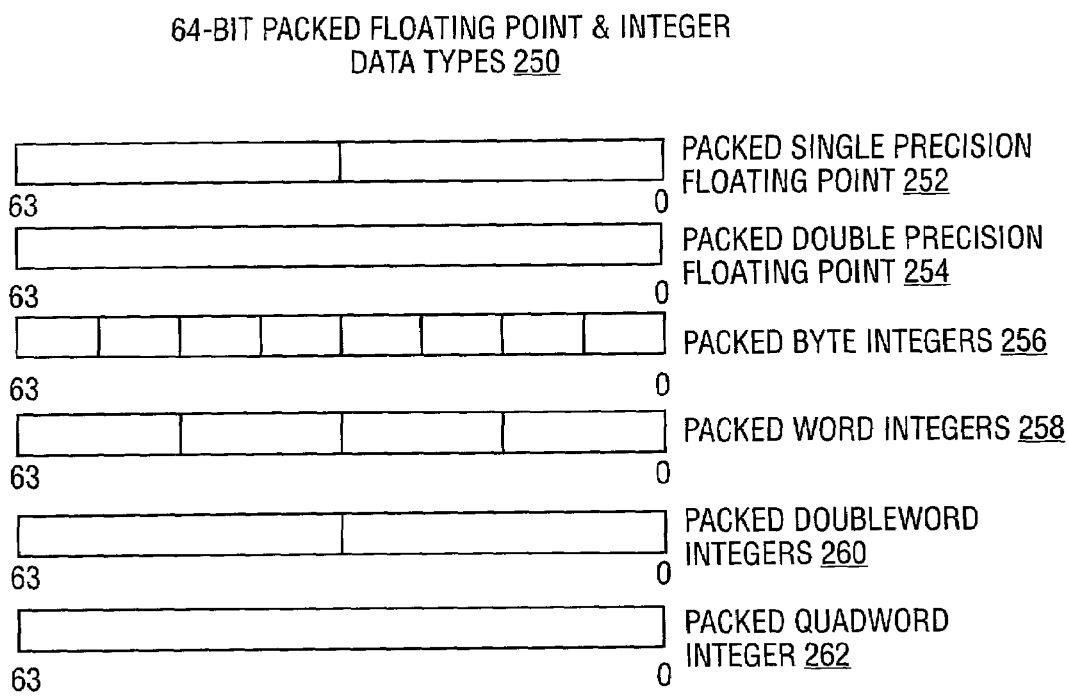

Referring now to FIGS. 3C and 3D, FIGS. 3C and 3D depict blocked diagrams illustrating 64-bit packed single instruction multiple data (SIMD) data types in accordance with one embodiment of the present invention. As such, FIG. 3C depicts four 64-bit packed data types: packed byte 242, packed word 244, packed doubleword 246 and packed quadword 248. Packed byte 242 is 64 bits long, containing 8 packed byte data elements. As described above, in packed data sequences, the number of data elements stored in a register is 64 bits divided by the length in bits of a data element. Packed word 244 is 64 bits long and contains 4 packed word elements. Each packed word contains 16 bits of information. Packed doubleword 246 is 64 bits long and contains 2 packed doubleword data elements. Each packed doubleword data element contains 32 bits of information. Finally, packed quadword 248 is 64 bits long and contains exactly one 64-bit packed quadword data element.

Referring now to FIG. 3D, FIG. 3D illustrates 64-bit packed floating-point and integer data types in accordance with a further embodiment of the present invention. Packed single precision floating point 252 illustrates the storage of two 32-bit floating-pint values in one of the SIMD registers 209 as depicted in FIG. 2. Packed double precision floating-point 254 illustrates the storage of one 64-bit floating point value in one of the SIMD registers 215 as depicted in FIG. 2. Packed byte integer 256 illustrates the storage of eight 32-bit integer values in one of the SIMD registers 215 as depicted in FIG. 2. Packed doubleword integer 260 illustrates the storage of two 32-bit integer values in one of the SIMD registers 215 as depicted in FIG. 2. Finally, packed quadword integer 262 illustrates the storage of a 64-bit integer value in one of the SIMD registers 215 as depicted in FIG. 2.

As will be described in further detail below, packed single precision floating-point 252 may be utilized to store two elements of a 2×2 sub-matrix such that the entire sub-matrix may be stored utilizing two 64-bit registers, each containing two vector elements which are stored in packed single precision floating-point format.

Matrix Inversion

As described above, 3D graphics provides an extremely popular technology, which provides users with real-life depiction of graphic objects which often imitate real-life. Unfortunately, 3D graphics systems require intensive computational requirements required for translating objects and coordinates between various coordinate systems. In fact, transforming a point from one coordinate system to another is one of the most important operations in 3D graphics. To accomplish transformation of one point from one coordinate system to another in one operation, a 3D point is treated as a four-dimensional (4D) vector [x, y, z, w]. Accordingly, the 3D point may be represented as a 4D vector such that the 3D point is now represented by homogenous coordinate [x/w, y/w, z/w].

A 3D pipeline, which is often utilized by 3D graphic systems, transforms an object from one coordinate system it was created in (object space) to the world coordinate system (world space) and then to the viewer coordinate system (view space). However, it is quite common that a value defined in the world or view space may require conversion back to its original created object space. As an example, lights are defined in the world space and are often transformed back to the object space in order to perform light intensity calculations. Generally, this conversion back to the object space is performed utilizing a 4×4 matrix inversion operation.

Unfortunately, the calculation of the matrix inverse is one of the more intensive operations performed on matrices. A standard way to calculate an inverse of the matrix by using a method called "Gaussian Elimination". For small matrices, it is usually more efficient to calculate the adjoint matrix and divide by the matrix's determinant. Accordingly, adjoint scaling is of the most commonly used implementations by conventional 3D graphic systems.

However, the calculation of the adjoint matrix is not easily converted into an algorithm utilizing the single instruction multiple data (SIMD) operators, as each element of the adjoint matrix is a function of nine of the elements from the source matrix (actually, the determinant of a 3×3 sub-matrix). Furthermore, those elements are not readily placed within a sequential order in memory, and consequentially, are not easily vectored for SIMD operations. Even when the calculation is finally vectorized, usually there are not enough registers within the architecture to contain all of the intermediate results.

Accordingly, the present invention describes a method of inverting a 4×4 source matrix using a sub-division technique which achieves improved computational locality when utilizing single instruction multiple data implementations. As such, utilizing the following equations, a 4×4 inverse matrix is divided into four inverse sub-matrices, iA, iB, iC and iD, and can be calculated directly from the four sub-matrices of the source matrix (A, B, C and D) according to the following equations:

$$iA=\text{adj}(A\cdot|D|-B\cdot\text{adj}(D)\cdot C)/dS \quad (1)$$

$$iB=\text{adj}(C\cdot|B|-D\cdot\text{adj}(B)\cdot A)/dS \quad (2)$$

$$iC=\text{adj}(B\cdot|C|-A\cdot\text{adj}(C)\cdot D)/dS \quad (3)$$

$$iD=\text{adj}(D\cdot|A|-C\cdot\text{adj}(A)\cdot B)/dS \quad (4)$$

where dS is the determinant of the source matrix. The determined 4×4 matrix dS can be calculated by the following formula $$dS=\det(\text{Src})=|A|\cdot|D|+|B|\cdot|C|-\text{trace}(\text{adj}(A)\cdot B\cdot\text{adj}(D)\cdot C) \quad (5)$$

Hence, utilizing the equations described above, the calculation of the adjoint matrix (for a 2×2 sub-matrix) requires two sign changes.

$$adj\begin{pmatrix}\alpha & \beta\\ \gamma & \delta\end{pmatrix}=\begin{pmatrix}\delta & -\beta\\ -\gamma & \alpha\end{pmatrix} \quad (6)$$

The sign inversion can be hidden in prior or subsequent calculations (i.e., when we use the adjoint matrix for the formation of a matrix product as described below). Therefore, the calculation of the adjoint matrix demands practically zero computation.

The terms adj(D)·C and adj(A)·B appear in Equation 5 and in Equations 1 and 4. Accordingly, they do not require recalculation. In addition, for the multiplication between adj(D)·C and adj(A)·B in Equation 5, the calculation of the two elements is not required, as the trace of a matrix is the sum of the diagonal elements. As such, four products, rather than eight products, are actually required to calculate the trace in trace ((adj(A)·B)·(adj(D)·(C)). Finally, in Equations 2 and 3, calculation of adj(B)·A and adj(C)·D are required. However, since we are using 2×2 sub-matrices, those values are given immediately from adj(A)·B and adj(D)·C as follows:

$$\text{adj}(B)\cdot A=\text{adj}(\text{adj}(A)\cdot B) \quad (7)$$

$$\text{adj}(C)\cdot D=\text{adj}(\text{adj}(D)\cdot C) \quad (8)$$

As such, utilizing the matrix sub-division technique as described, the calculation of the matrix inverse results in a faster computation speed. In comparison to a prior art implementation, the single instruction multiple data (SIMD) implementation described herein is about 40% faster than the standard implementation. Since the described method has better computational locality, even a scalar implementation of the method herein is faster than a prior art implementation. Accordingly, one embodiment will be described herein for implementation of the Equations 1–5 utilizing 128-bit double-precision floating-point registers, as depicted in FIG. 3B. However, the following implementations may be utilized with various register lengths and specifically utilizing 64-bit registers to thereby provide single precision floating point values.

Accordingly, referring now to FIG. 4A, FIG. 4A depicts matrix sub-division of a source matrix 300. As such, the source matrix S is divided into four 2×2 sub-matrices: A, B, C and D, as depicted in FIG. 4A. As depicted in FIG. 4B, sub-matrices A 310, B 320, C 330 and D 340 represent the various elements of the source matrix 300. Therefore, a vector representation of the two element rows of each sub-matrix may be formed as illustrated in FIG. 4C.

Figure 4D:
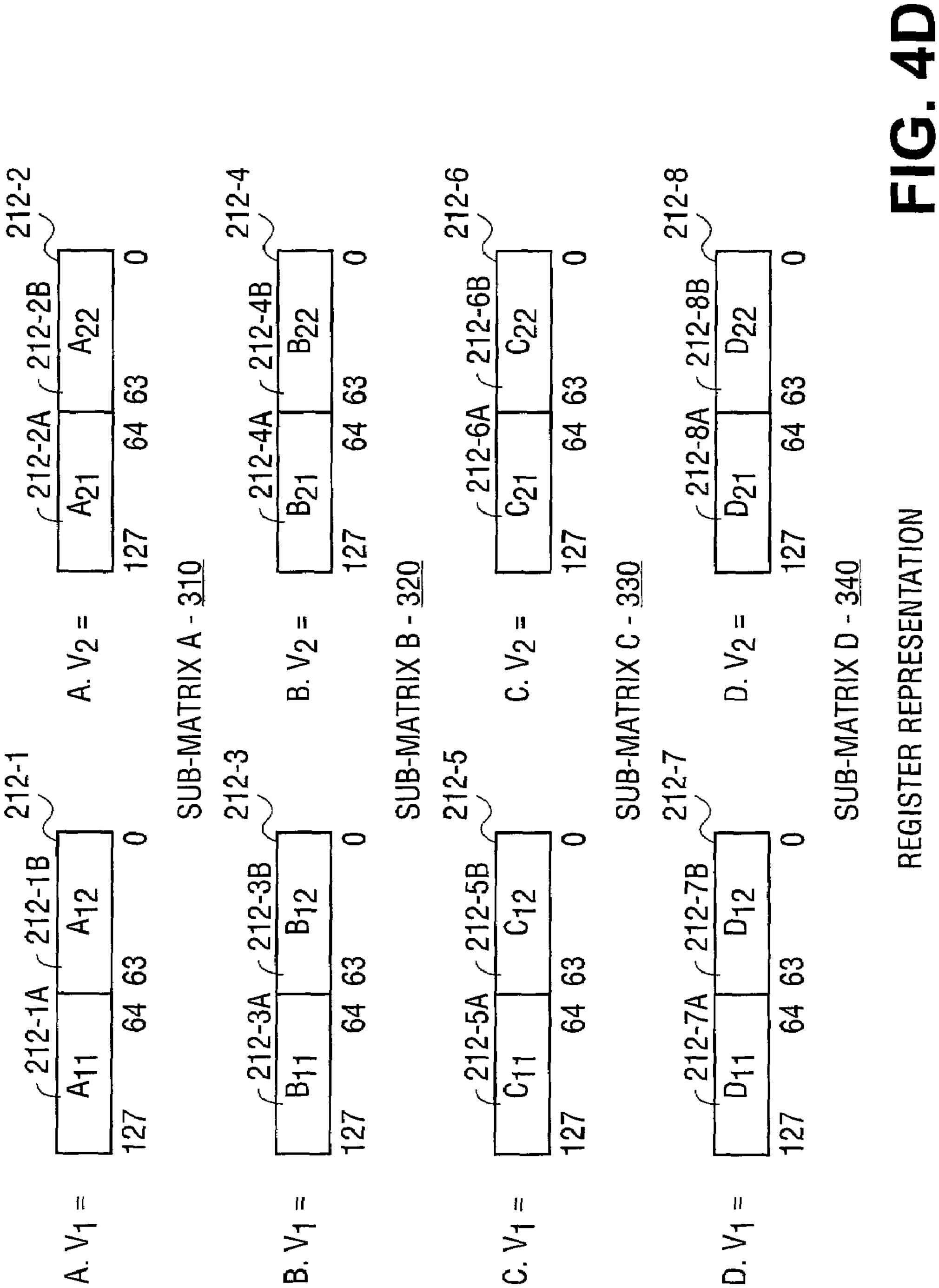
FIG. 4D depicts a block diagram illustrating a register representation of the vector representation of sub-matrices, as depicted in FIG. 4C, in accordance with a further embodiment of the present invention.

As depicted in FIG. 4D, a sub-matrix is represented by vector 1 (V1) 212-1, 212-3, 212-5, 212-7, which contains a first row of the sub-matrix elements. In addition, vector 2 (V2) 212-2, 212-4, 212-6, 212-8 includes a second row of the various sub-matrices. As such, FIG. 4D depicts a register representation of V1 and V2 of each sub-matrix. Consequently, utilizing single instruction multiple data (SIMD) techniques, each row of each sub-matrix may be stored within a 128-bit single instruction multiple data register 209, or 64-bit single instruction multiple data register 215, as depicted in FIG. 2. As such, a sub-matrix can be loaded into two registers in the processor 109 (FIGS. 1 and 2). This storage format also enables concurrent calculations, which result in improved efficiency for calculating an inverse of the source matrix as compared to conventional techniques.

Block Diagrams

Figure 5:
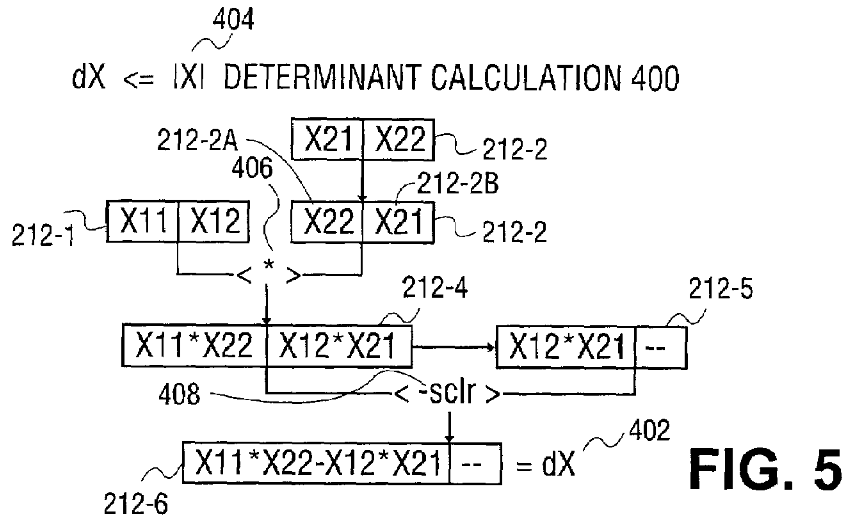
FIG. 5 depicts a block diagram illustrating determinant calculation of a sub-matrix, as depicted in FIGS. 4A–4D, in accordance with one embodiment of the present invention.

Referring now to FIG. 5, FIG. 5 depicts determinant calculation 400 of a sub-matrix in accordance with one embodiment of the present invention. As illustrated, the depiction represents the vector element pairs (rows) of the sub-matrices stored within 128-bit double-precision floating-point registers 209, or 64-bit single-precision register 215. However, those skilled in the art will recognize that the present invention may be implemented with the desired registers available from an architecture, such that registers containing less than 64 bits may be utilized, while sacrificing precision provided by double-precision representation of floating-point values.

Referring again to FIG. 5, FIG. 5 depicts the calculation of a determinant 400 as may be utilized by Equations 1–5 in accordance with one embodiment of the present invention. As illustrated, the elements X11 and X12 are either loaded into a register 212-1, which is for example a 128-bit register as depicted in FIGS. 3B, 4A and 4B, or stored in memory.

The elements X11 and X12 represent the elements of the first row within a sub-matrix X for which a determinant is being calculated. Next, the second row elements X21 and X22 are loaded into a register 212-2.

In one embodiment, a shuffle operation is performed to transpose the elements within register 212-2 such that X22 is now a first element 212-2*a* of the register 212-2 and X21 is now a second element 212-2*b* of the register 212-2. Once shuffled, a multiplication operation 406 is performed with the result of the multiplication operation stored in the register 212-4. Next, a shuffle operation is used in order to copy a second element 212-4*b* of the product into the first element 215-5A of register 212-5. Finally, a scalar subtraction operation 408 is performed utilizing register 212-4 and 212-5 in order to generate the determinant value 402, which is stored in register 212-6.

As illustrated by FIG. 5, as well FIGS. 6–11, the various selections of registers to be loaded during the various calculations as will be described herein, is provided to illustrate one possible embodiment of the invention. However, those skilled in the art will recognize that the various selection of registers in which to load and when to copy-in or replace the element from memory may be provided via compiler optimizations in the generated assembly code when the present invention is implemented in software. Alternatively, the various registers are selected in implementations using application specific integrated circuits or microcode for directing integrated circuit packet implementations of the embodiments described herein.

Figure 6:
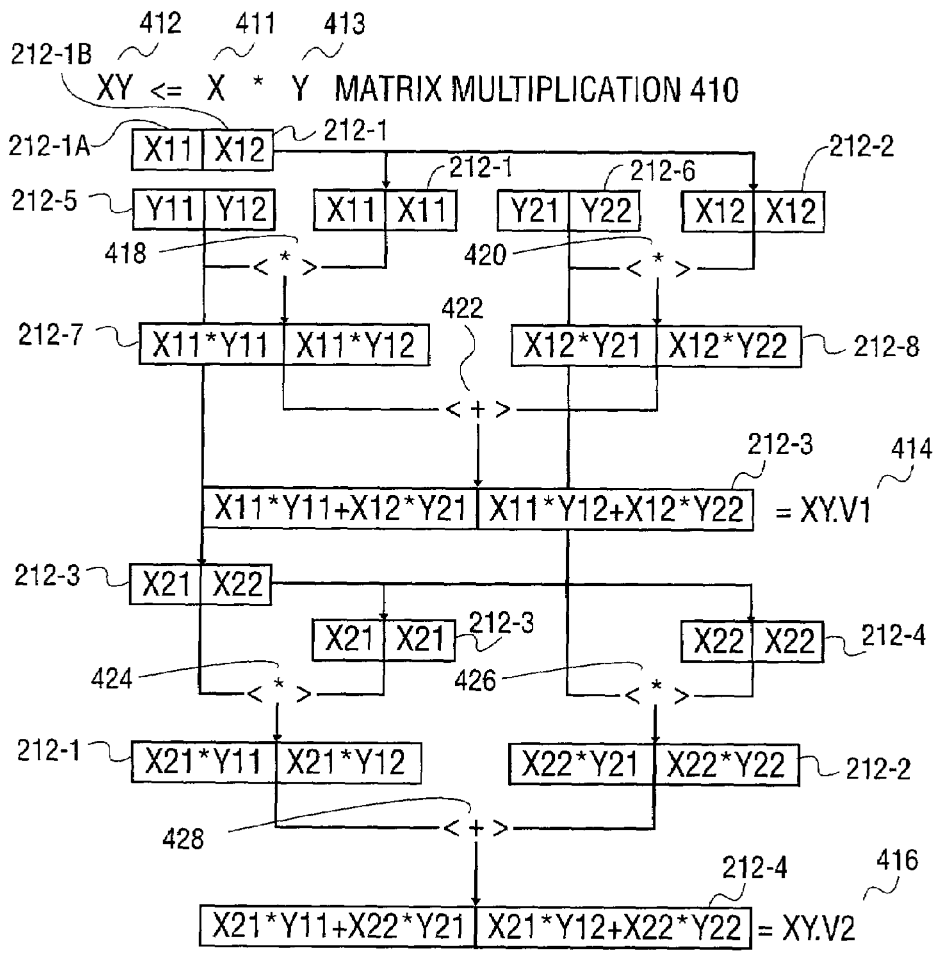
FIG. 6 depicts a block diagram illustrating matrix multiplication of two sub-matrices, as depicted in FIGS. 4A–4D, in accordance with a further embodiment of the present invention.

Referring now to FIG. 6, FIG. 6 depicts a matrix multiplication operation 410 of two sub-matrices in accordance with a further embodiment of the present invention, which is utilized by Equations 1–5 in order to calculate an inverse of the source matrix 300. As illustrated, a first row of the sub-matrix X 411 is stored in register 212-1. Once stored, the values 212-1*a* and 212-1*b* are shuffled utilizing a second register 212-2, such that registers 212-1 and 212-2 contain duplicate element pairs of X11 and X12, respectively. Next, a first row of sub-matrix Y 413 is stored in register 212-5 while a second row of sub-matrix Y 413 is stored in register 212-6.

Following the shuffling, a multiplication operation 418 is performed utilizing registers 212-5 and 212-1 with the result of the multiplication stored in register 212-7. Simultaneously, a multiplication operation 420 is performed utilizing register 212-6 and 212-1 with the results stored in register 212-8. Finally, an addition operation 422 is performed utilizing registers 212-7 and 212-8 to produce the result 422, which is stored in register 212-3. Accordingly, the result generated represents a first portion of the matrix multiplication operation 410, which is stored in vector 1 (V1) 422 of the result XY.

Concurrent with the calculation of the first row of the matrix multiplication operation 410, a register 212-3 is loaded with the second row of the sub-matrix X. Once loaded, the elements of register 212-3 are shuffled utilizing registers 212-3 and 212-4, such that registers 212-3 and registers 212-4 include duplicate pairs of the elements X21 and X22, respectively. Next, a multiplication operation 424 is performed of registers 212-5 and 212-3 in order to generate a result which is stored in register 212-1. Concurrently, register 212-6 is multiplied with register 212-4 with the result of the multiplication operation 426 stored in register 212-2. Finally, an addition operation 428 is performed in order to generate the second row of the matrix products, which is stored in register 212-4. As such, the multiplication operation result XY 412 is stored within a pair of registers 212-3 and 212-4, which are referenced by providing parameter V1 for register 212-3 or V2 for register 212-4.

Figure 7:
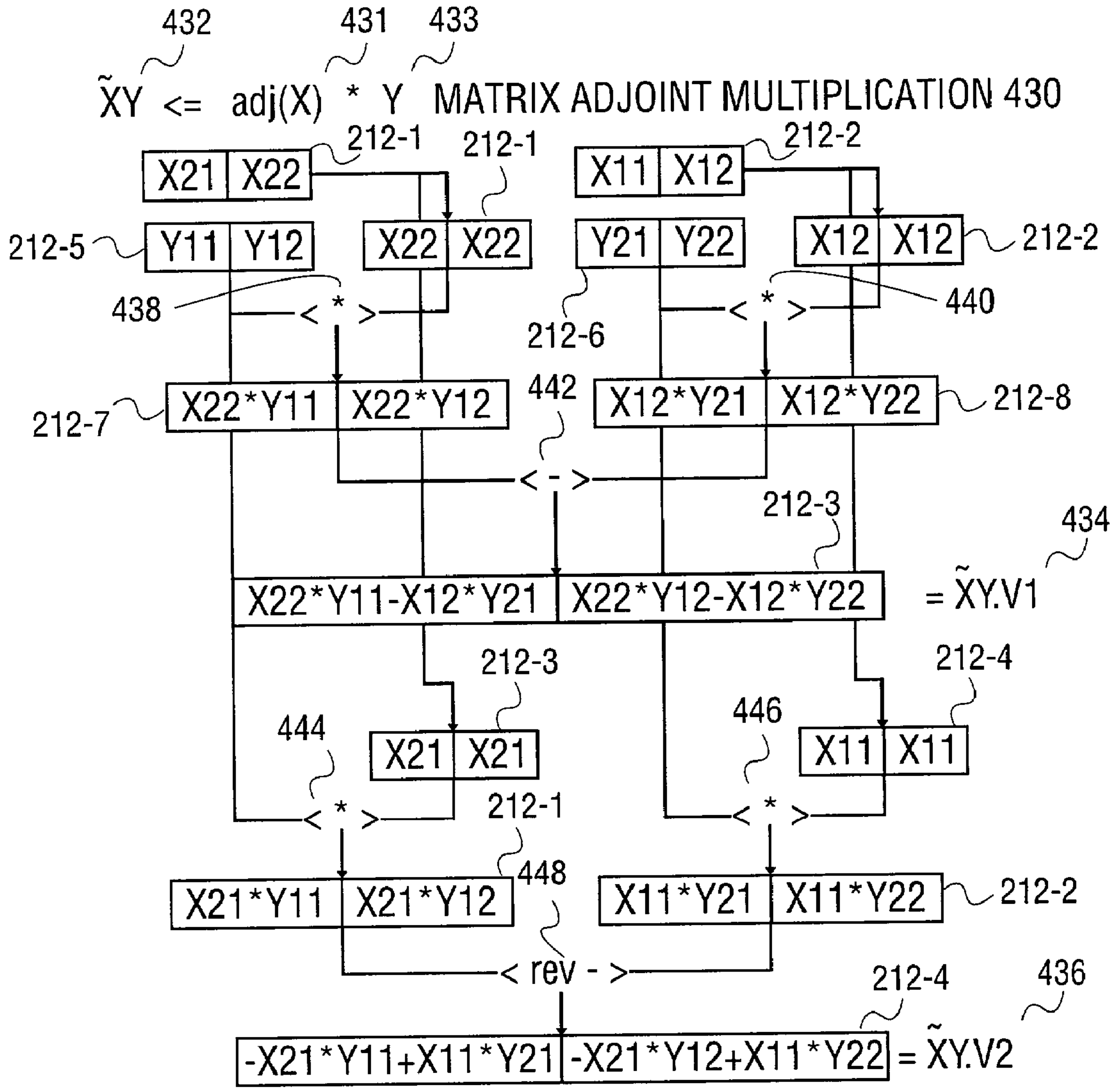
FIG. 7 depicts a block diagram illustrating a matrix multiplication of an adjoint of sub-matrix with another sub-matrix, as depicted in FIGS. 4A–4D, in accordance with a further embodiment of the present invention.

Referring now to FIG. 7, FIG. 7 depicts a matrix multiplication operation 436 of an adjoint of sub-matrix with another sub-matrix, which is utilized by Equations 1–5, as described above in accordance with a further embodiment of the present invention. Initially, the rows of a source sub-matrix X 431 are stored in registers 212-1 and 212-2, respectively. Once stored, the vector element pairs within registers 212-1 and 212-2 are expanded utilizing, for example a register shuffle operation, with the results of the shuffle operation stored in registers 212-3 and 212-4. The rows of source sub-matrix Y 433 are stored in registers 212-5 and 212-6.

Once the data is expanded, a multiplication operation 438 is performed utilizing registers 212-1 and 212-5 with a result of the operation stored in register 212-7. Concurrently, a multiplication operation 440 is performed utilizing registers 212-2 and 212-6, with the result stored in register 212-8. Finally, a subtraction operation 442 is performed utilizing the contents of registers 212-7 and 212-8, with the results stored in register 212-3. As such, register 212-3 stores the first row of the result sub-matrix $\tilde{X}Y$ 434.

Following storage of the values, a multiplication operation 444 is performed utilizing registers 212-5 and 212-3, with the result of the operation stored in register 212-1. Concurrently, a multiplication operation 446 is performed utilizing vectors 212-4 and 212-6, with the results stored in register 212-5. Finally, a subtraction operation 448 is performed utilizing vectors 212-2 and 212-1, with a result of the operation 436 stored in register 212-2. As such, now the register stores the second row of the result sub-matrix $\tilde{X}Y$. Accordingly, the result of the matrix adjoint multiplication operation 440 is stored in registers 212-3 and 212-4.

Figure 8:
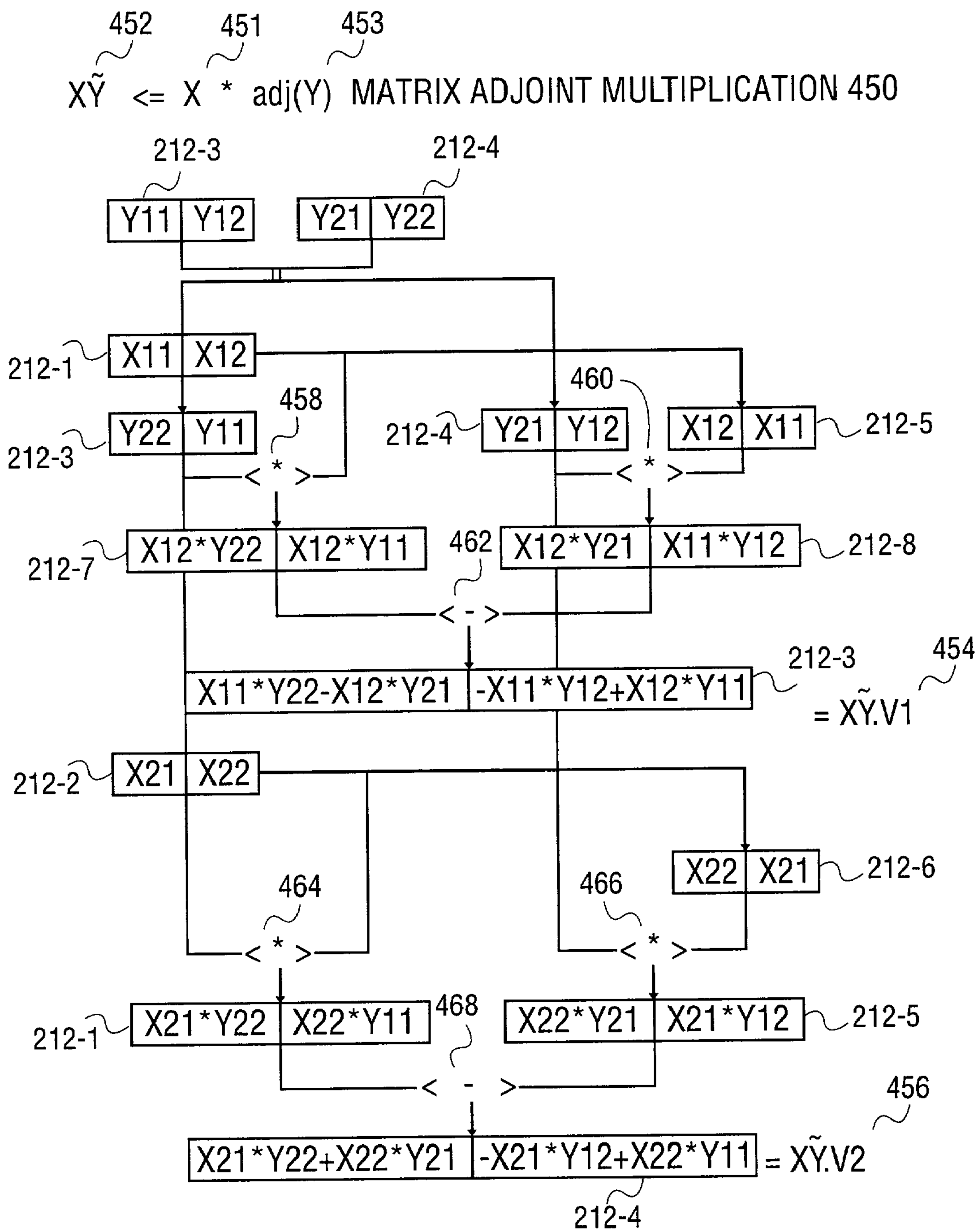
FIG. 8 depicts a block diagram illustrating matrix multiplication of a sub-matrix with an adjoint of another sub-matrix, as depicted in FIGS. 4A–4D, in accordance with a further embodiment of the present invention.

Referring now to FIG. 8, FIG. 8 depicts a matrix multiplication operation 450 in order to multiply a sub-matrix X 451 by an adjoint of sub-matrix Y 453, which is utilized in Equations 1–5, as described above, in accordance with a further embodiment of the present invention. As illustrated, the rows of sub-matrix Y 453 are initially stored in registers 212-3 and 212-4. Once stored, a shuffle operation stores the elements of registers 212-3 and 212-4 in registers 212-3 and 212-4 with the elements reorganized such that register 212-3 includes elements Y22 and Y11, while register 212-4 includes elements Y21 and Y12 of the sub-matrix Y 453.

Concurrently, first row of sub-matrix X 451 is stored in register 212-1, while the elements of the first row element pair are transposed and stored in register 212-5. Concurrently, the second row of sub-matrix X 451 are stored in register 212-2, while the transposed version of the elements are transposed and stored in register 212-6.

Next, a multiplication operation 458 is performed utilizing registers 212-1 and 212-3, with a result of the operation stored in register 212-7. Concurrently, a multiplication operation 460 is performed utilizing registers 212-4 and 212-5, with a result of the operation stored in register 212-8. Next, a subtraction operation 462 is performed utilizing registers 212-7 and 212-8, with a result of the operation stored in register 212-3. As such, register 212-3 will contain a first row 454 as a result of the matrix multiplication operation 450 $X\tilde{Y}$.

Concurrently, a multiplication operation 464 will be performed utilizing the contents of registers 212-2 and 212-3, with the results stored in register 212-1. Concurrently, a multiplication operation 466 will be performed utilizing the contents of register 212-4 and 212-6, with the result of the operation stored in register 212-5. Finally, a subtraction operation 468 will subtract the contents of register 212-5 from register 212-1, with a result of the operation stored in register 212-2. As a result, a second row of the matrix multiplication operation 450 will be stored in register 212-2, such that the final result of the matrix multiplication operation 452 is stored as two rows 452 and 454, which are contained in registers 212-3 and 212-2.

Figure 9:
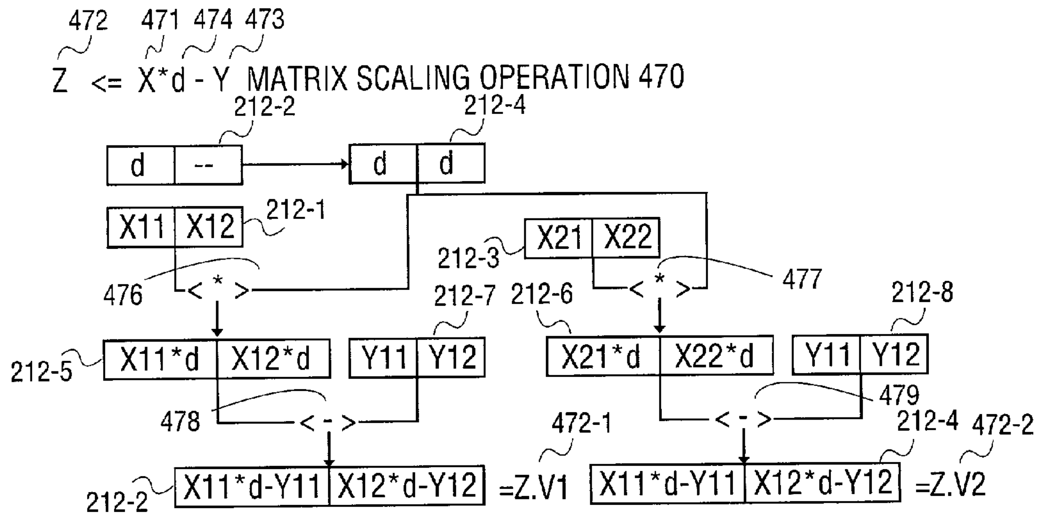
FIG. 9 depicts a block diagram illustrating matrix scaling of the sub-matrices, as depicted in FIGS. 4A–4D, in accordance with a further embodiment of the present invention.

Referring now to FIG. 9, FIG. 9 depicts a matrix scaling operation 470, which is utilized during the calculation of the inverse of a source matrix 300 as illustrated by Equations 1–5, as described above, in accordance with a further embodiment of the present invention. The matrix scaling operation is illustrated by the formula Z=X·d−Y, where d is a scalar. First, the scalar d is loaded and then expanded, using shuffle operation, into a full register 212-4. Concurrently, the first row of sub-matrix X 471 is stored in register 212-1, while the second row of sub-matrix X 471 is stored in register 212-3. Once stored, a multiplication operation 476 is performed utilizing the contents of registers 212-1 and 212-4. Concurrently, a multiplication operation 477 is performed utilizing the contents of registers 212-3 and 212-4, with the result of the multiplication operations 476 stored in registers 212-5 and 212-6.

Next, the first and second rows of sub-matrix Y 473 are stored in registers 212-7 and 212-8. Once stored, a subtraction operation 478 is performed utilizing the contents of registers 212-5 and 212-7, with a result of the subtraction operation 478 stored in register 212-2. Concurrently, a second subtraction operation 479 is performed utilizing the contents of registers 212-6 and 212-8, with a result of the subtraction operation stored in register 212-4. Accordingly, the matrix scaling operation result 472 is stored as two rows, which are stored in registers 212-2 and 212-4, with corresponding results Z.V1 472-1 and Z.V2 472-1 for selecting the result 472.

Figure 10:
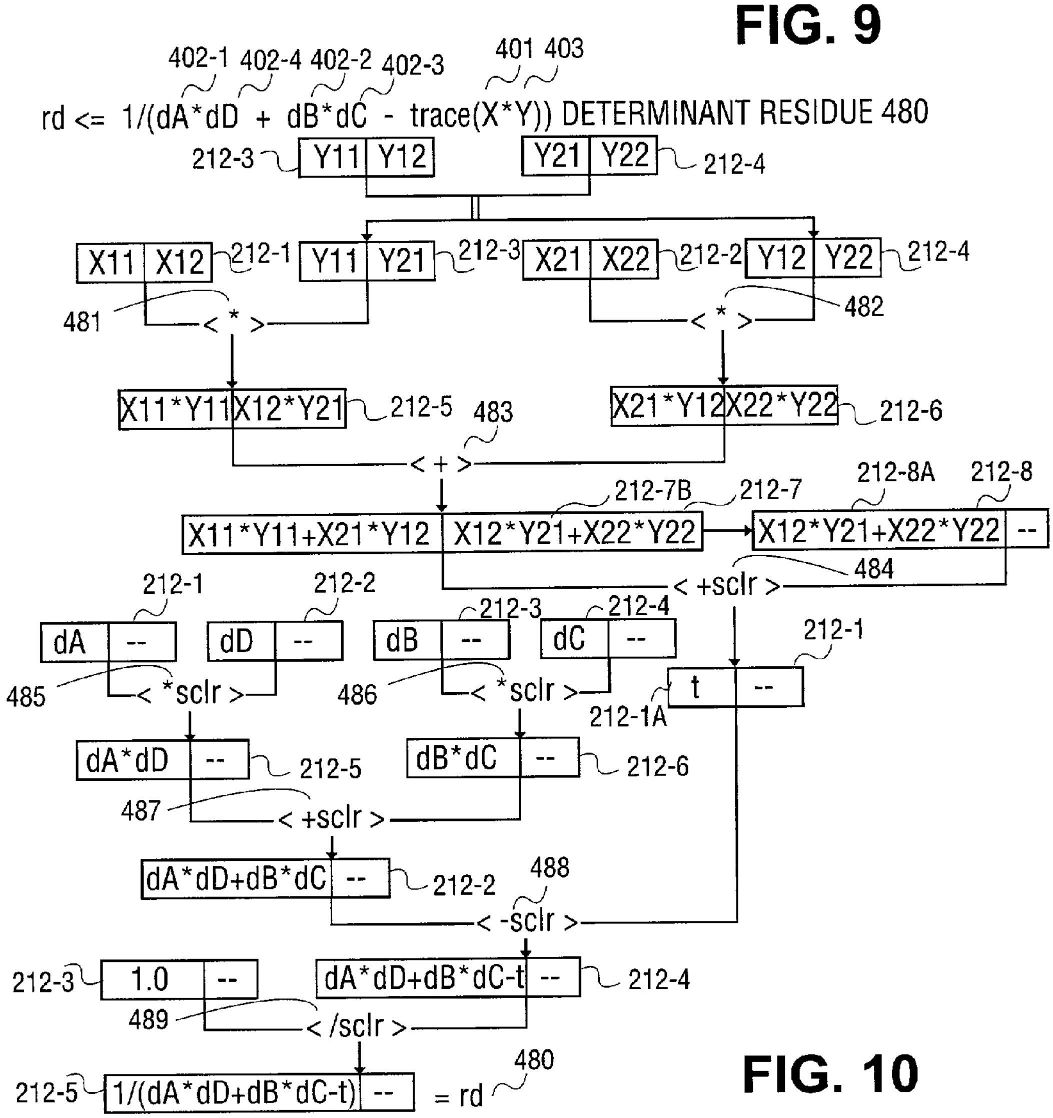
FIG. 10 depicts a block diagram illustrating calculation of the determinant residue of a source matrix, as depicted in FIGS. 4A–4D, in accordance with a further embodiment of the present invention.

Referring now to FIG. 10, FIG. 10 illustrates a determinant residue calculation of the matrix 480, which is utilized by Equations 1–4, and embodies Equation 5, as described above. In one embodiment, sub-matrix X refers to intermediate sub-matrix product adj(B)·A while sub-matrix Y refers to intermediate sub-matrix product adj(D)·C. Initially, the first row of sub-matrix X 401 is stored in register 212-1. Concurrently, a vector row of sub-matrix X 401 is stored in register 212-2. Concurrently, a first row of sub-matrix Y 403 is stored in register 212-3, while a row of sub-matrix Y 403 is stored in register 212-4. Next, the elements contained in registers 212-3 and 212-4 are shuffled, such that elements Y11 and Y21 are stored in registers 212-3 and elements Y12 and Y22 are stored in register 212-4, as illustrated.

Once stored, a multiplication operation 481 is performed utilizing the contents of registers 212-2 and 212-3, with a result of the operation 481 stored in register 212-5. Concurrently, a multiplication operation 482 is performed utilizing the contents of registers 212-2 and 212-4, with a result of the multiplication operation 482 stored in register 212-6. Next, an addition operation 483 is performed utilizing the contents of registers 212-5 and 212-6, with a result of the addition operation stored in register 212-7. Once stored, the second element 212-7*a* of register 212-7 is stored as the first element 212-8*a* of register 212-8. Next, a scalar addition operation 484 is performed utilizing the contents of registers 212-7 and 212-8 to form a trace value t=trace(X·Y) [=trace ($\tilde{A}$B·$\tilde{D}$C)], which is stored as a first vector element 212-1*a* in register 212-1.

Concurrently, a determinant of each sub-matrix (dA, dB, dC, dD ) is stored as a first element vector within registers 212-1, 212-2, 212-3 and 212-4, respectively. Concurrently, a scalar multiplication operation 485 is performed utilizing the contents of registers 212-1 and 212-2, with the results stored as the first element 212-5*a* of register 212-5. Concurrently, a scalar multiplication operation 486 is performed utilizing the contents of registers 212-3 and 212-4, with a result of the scalar multiplication operation 486 stored in register 212-6. Next, a scalar additional operation 487 is performed utilizing the first element of registers 212-5 and 212-6, with a result of the operation stored in register 212-2.

Next, a scalar subtraction operation 488 is performed utilizing the first element 212-2*a* of register 212-2 and the first element 212-1*a* of register 212-1, to form the value of dS=det(Src)=|A|·|D|+|B|·|C|−t stored as the first element 212-4*a* of register 212-4. Next, a value of one is stored as the first element 212-3*a* of register 212-3, such that a scalar division operation 489 is performed utilizing a first element of registers 212-2 and 212-1. A result of the scalar division operation 489 is stored as the first element 212-4*a* of register 212-4 to form the determinant residue rd=1/dS value 480.

Figure 11:
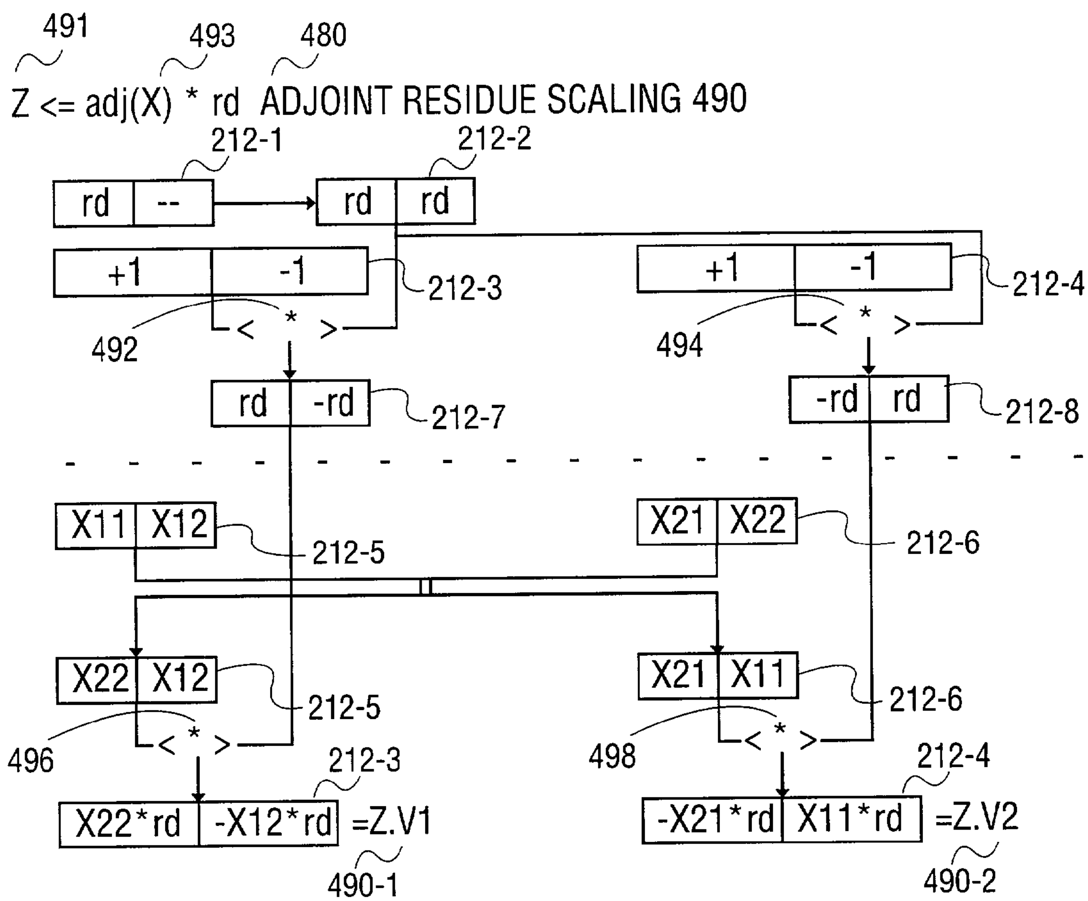
FIG. 11 depicts a block diagram illustrating calculation of an adjoint matrix scaled by a determinant residue, as depicted in FIGS. 4A–4D, in accordance with a further embodiment of the present invention.

Finally, referring to FIG. 11, FIG. 11 illustrates calculation of an adjoint matrix scaled by a determinant residue 490, utilized during the calculation of the inverse of the source matrix 300, for example within Equations 1–4, as described above. Initially, the residue value rd is calculated in FIG. 10 and loaded as the first element 212-1*a* of register 212-1 and then expanded, using shuffle operation into both elements of register 212-2. Concurrently, the value of plus one and minus one are stored in registers 212-3, and the values of minus one and plus one are stored in register 212-4.

Next, a multiplication operation 492 is performed utilizing the contents of registers 212-1 and 212-3 to form the residue value (rd) and a negative residue value (−rd), which are stored as the first element 212-7*a* and the second element 212-7*b* of register 212-7. Concurrently, another multiplication operation 494 is performed utilizing the contents of registers 212-2 and 212-4 to form a negative residue value (−rd) and a positive residue value (+rd), which are stored as the first element 212-8*a* and the second element 212-8*b* of register 212-8. The two registers 212-7 and 212-8 can be kept aside for future use.

Depending on the processor, using an exclusive OR (XOR) operation instead of a multiplication operator may be faster. In this case, the multiplication operators 492 and 494 should be replaced with XOR operators. However, for XOR operator to change the sign bit, contents of registers 212-3 and 212-4 should be all zeros, except for the most significant bits of 212-3*b* and 212-4*a*, which represent the sign bit when using IEEE floating-point numbers, set to 1.

Next, the first elements X11 and X12 of sub-matrix X 493 are stored in register 212-5 while the second row element vector pair A21 and A22 are stored in register 212-6. Once stored, the values are transposed using a shuffle operation such that X22 and X12 are stored in register 212-5, while X21 and X11 are stored in register 212-6. Next, a multiplication operation 496 is performed utilizing the contents of registers 212-5 and 212-17, with a result of the operation 496 stored in register 212-3. Concurrently, a multiplication operation 498 is performed utilizing the contents of registers 212-6 and registers 212-8, with a result of the operation 498 stored in register 212-4. Accordingly, the scaled adjoint adj(X)·rd result is stored within register 212-3 and 212-4. Procedural methods for implementing the teachings of the present invention are now described.

Operation

Figure 12:
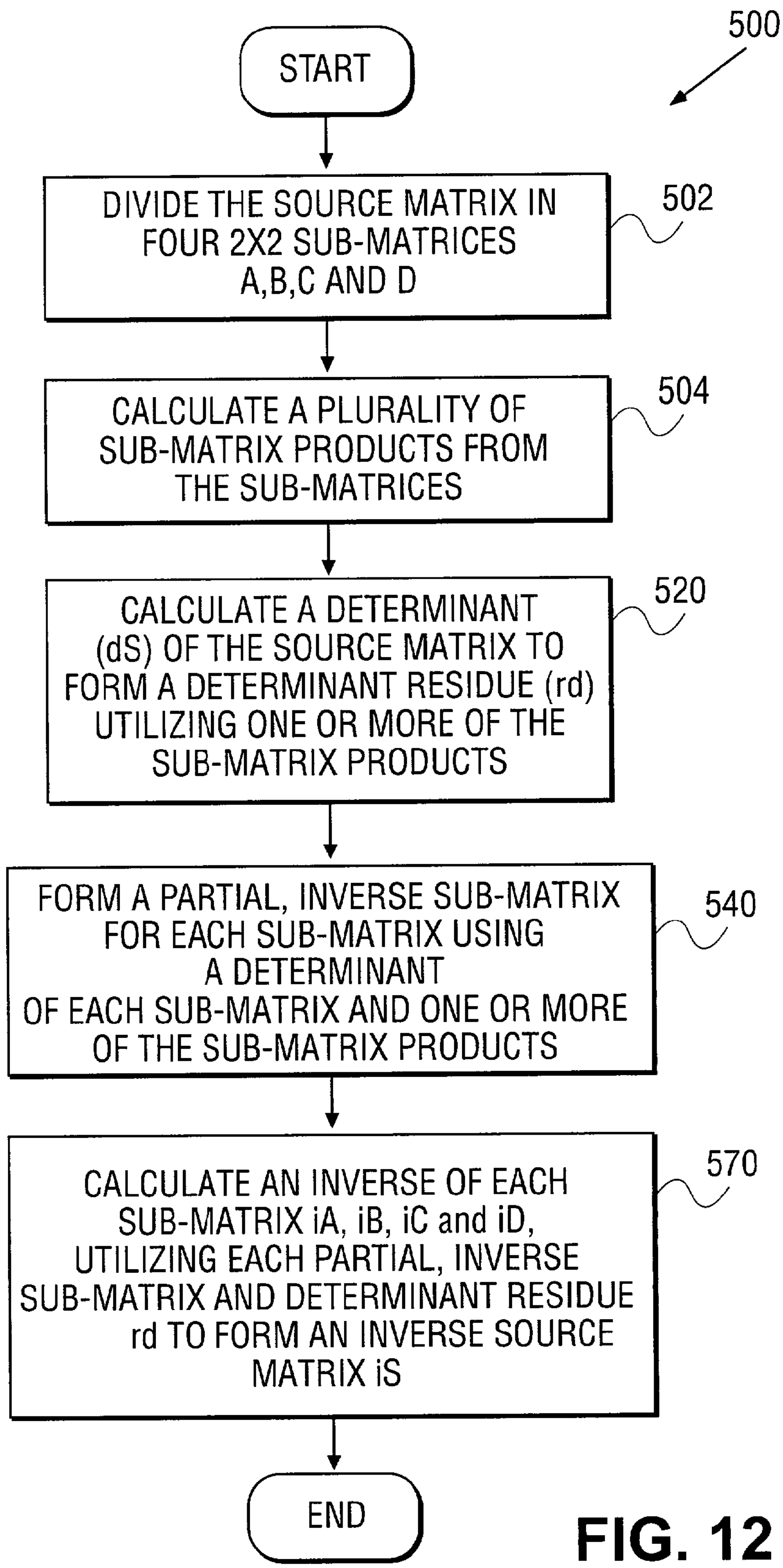
FIG. 12 depicts a flowchart illustrating a method for inverting a 4×4 matrix in accordance with one embodiment of the present invention.

Referring now to FIG. 12, a method 500 is depicted for inverting a 4×4 matrix, for example, in the computer system 100 depicted in FIGS. 1-3D. In an embodiment of the present invention, the inverse of the source matrix 300 is calculated utilizing Equations 1–9, as described above, and further illustrated using registers 209, as illustrated in FIG. 2 and in FIGS. 5–11. In one embodiment, the method includes five stages. However, the distinction between the various stages is given one for simplicity and should not be construed in a limiting sense. Moreover, the order within an actual implementation actual number of stages may vary, as mentioned above.

At process block 502, the source matrix 300 is divided into four 2×2 sub-matrices, A, B, C and D, as depicted in FIGS. 4A–4D. This is a preliminary stage, and no actual calculation is performed at this point. Once divided, at process block 504, a plurality of sub-matrix products are calculated from the sub-matrices. In one embodiment, the plurality of sub-matrix products include four final sub-matrix products: $B\cdot\text{adj}(D)\cdot C(B\tilde{D}C)$, $D\cdot\text{adj}(B)\cdot A(D\tilde{B}A)$, $A\cdot\text{adj}(C)\cdot D(A\tilde{C}D)$, and $C\cdot\text{adj}(A)\cdot B(C\tilde{A}B)$, which are used in Equations 1–4. The flowchart for process block 504 is further depicted in FIG. 13.

Next, at process block 520, a determinant of the source matrix (dS) is calculated utilizing Equation 5. Equation 5 uses the determinants of the four sub-matrices (dA, dB, dC and dD) and two intermediate sub-matrix products ($\text{adj}(A)\cdot B$ and $\text{adj}(D)\cdot C$) of the plurality of sub-matrix products previously calculated at process block 504. The flowchart for process block 520 is further depicted in FIG. 14. Once the determinant of the source matrix 300 is calculated, at process block 530 the determinant residue (rd) of the source matrix 300 is calculated as rd=1/dS.

Next, at process block 540, partial inverse is calculated for each sub-matrix (pA, pB, pC and pD). In one embodiment, the partial inverse sub-matrices are constructed utilizing the sub-matrix determinants and the final sub-matrix products previously calculated at process block 504. The flowchart for process block 540 is further depicted in FIG. 15. Finally, at process block 570, an inverse of each sub-matrix is calculated as iA, iB, iC and iD, utilizing each partial inverse sub-matrix. The inverse sub-matrices are constructed from the partial inverses that were obtained in process block 540 using the equation $iX=\text{adj}(X)\cdot rd$. Finally, the inverse of the source matrix (iS) is formed from the four sub-matrices inverse according to the following rule:

$$iS=\begin{pmatrix} iA & iB \\ iC & iD \end{pmatrix}.$$

Figure 16:
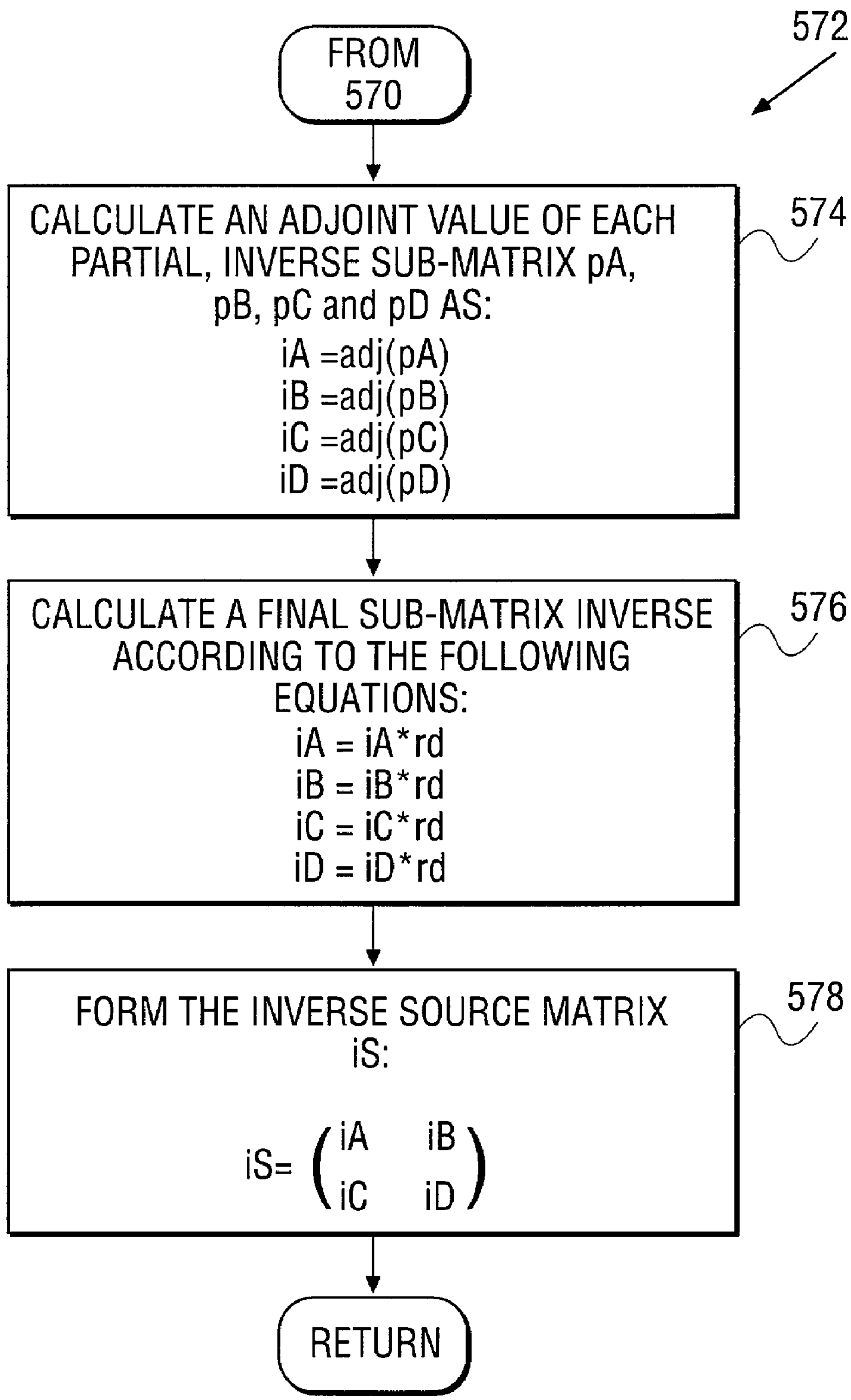
FIG. 16 depicts a flowchart illustrating an additional method for constructing a source matrix inverse from the partial inverse sub-matrices, as depicted in FIG. 12, with a further embodiment of the present invention.

The flowchart for process block 570 is further depicted in FIG. 16.

Figure 13:
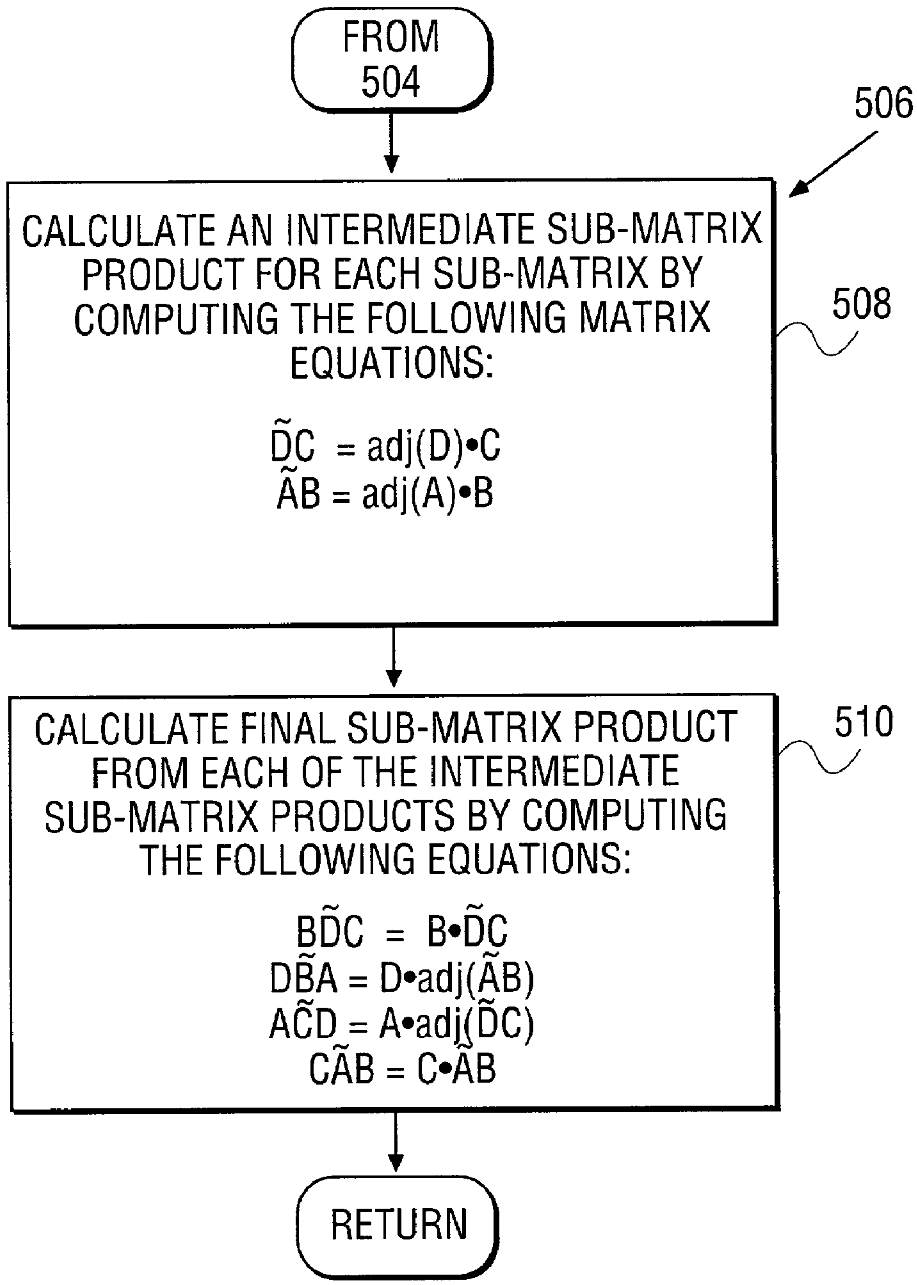
FIG. 13 depicts a flow chart illustrating an additional method for calculating sub-matrix intermediate and final products, as depicted in FIG. 12, in accordance with a further embodiment of the present invention.

Referring now to FIG. 13, FIG. 13 depicts a flowchart illustrating an additional method 506 for calculating the plurality of sub-matrix products of process block 504, as depicted in FIG. 12, in accordance with a further embodiment of the present invention. At process block 508, intermediate sub-matrix product (utilized in calculating the final sub-matrix products) are calculated for each sub-matrix by computing the following equations:

$$\tilde{D}C=\text{adj}(D)\cdot C$$

$$\tilde{A}B=\text{adj}(A)\cdot B$$

$$\tilde{B}A=\text{adj}(\tilde{A}B)[=\text{adj}(B)\cdot A]$$

$$\tilde{C}D=\text{adj}(\tilde{D}C)[=\text{adj}(C)\cdot D] \tag{9}$$

In one embodiment, the intermediate sub-matrix products within Equation 9 are calculated utilizing sub-matrix row representations as depicted in FIG. 7. Intermediate sub-matrix product operators $\tilde{B}A=\text{adj}(\tilde{A}B)[=\text{adj}(B)\cdot A]$ and $\tilde{C}D=\text{adj}(\tilde{D}C)[=\text{adj}(C)\cdot D]$ are provided to emphasize the relation shown in Equation 6 described above. Next, at process block 510, the final sub-matrix products are calculated from the intermediate sub-matrix products to complete formation of the plurality of matrix products of process block 504 by computing the following equations:

$$B\tilde{D}C=B\cdot\tilde{D}C$$

$$D\tilde{B}A=D\cdot\text{adj}(\tilde{A}B)[=D\cdot\tilde{B}A]$$

$$A\tilde{C}D=A\cdot\text{adj}(\tilde{D}C)[=A\cdot\tilde{C}D]$$

$$C\tilde{A}B=C\cdot\tilde{A}B \tag{10}$$

In one embodiment, calculating of the sub-matrix products operator of Equation 10 for the final sub-matrix products is performed utilizing the vector representation as depicted in FIGS. 6 and 8. Once performed, control flow returns to process block 504, as depicted in FIG. 12.

Figure 14:
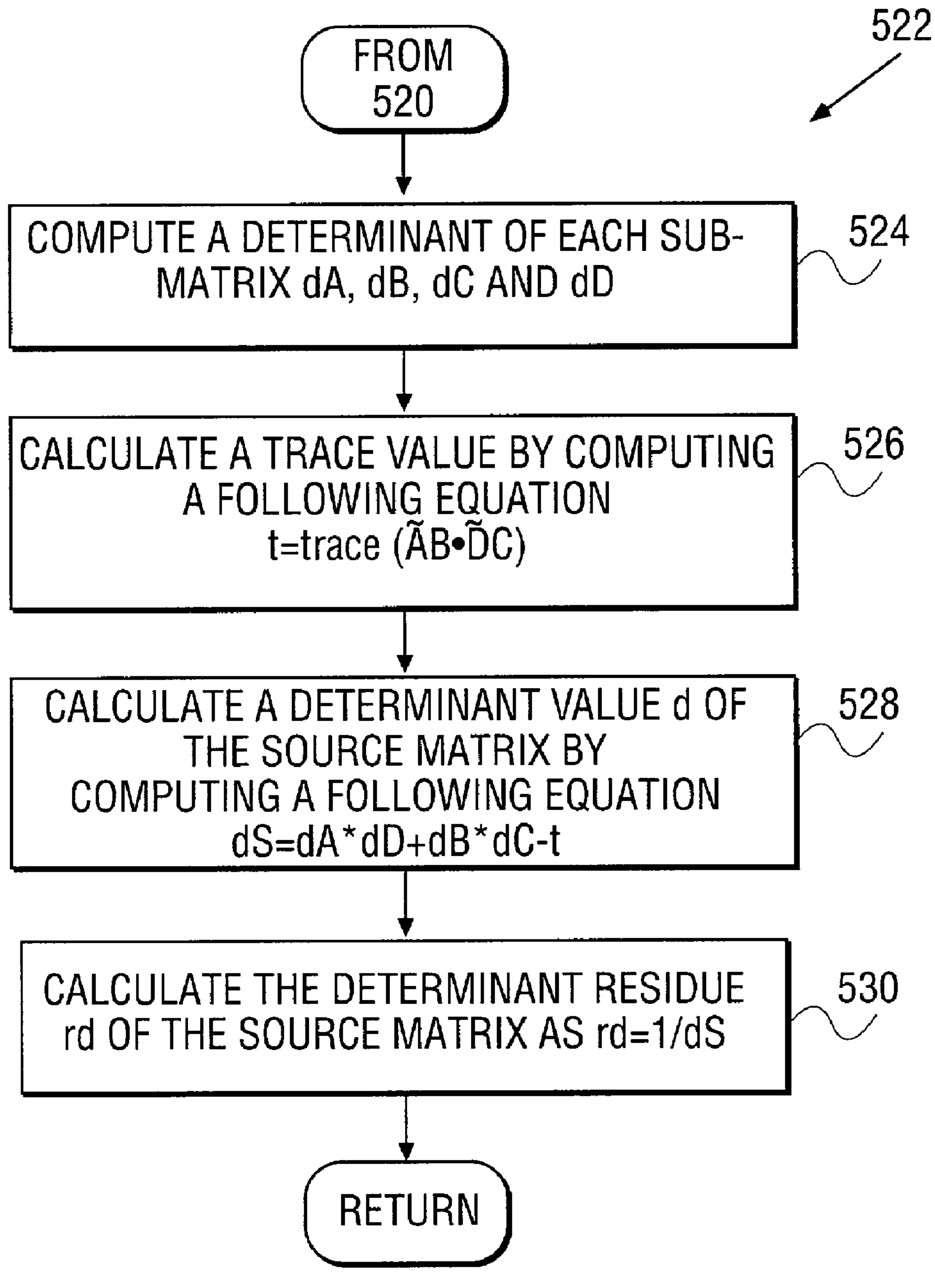
FIG. 14 depicts a flowchart illustrating an additional method for calculating the determinant residue of a source matrix, as depicted in FIG. 12, in accordance with a further embodiment of the present invention.

Referring now to FIG. 14, FIG. 14 depicts a flowchart illustrating an additional method 522 for calculating the determinant of the source matrix 300 (dS) of process block 520, as depicted in FIG. 12, in accordance with an exemplary embodiment of the present invention. At process block 524, a determinant of each sub-matrix is computed as dA, dB, dC and dD. In one embodiment, this determinant calculation is performed utilizing the vector representation as depicted in FIG. 5. Next, at process block 526, a trace value is computed by calculating the following equation, without calculating the actual product ($\tilde{A}B\cdot\tilde{D}C$):

$$t=\text{trace}(\tilde{A}B\cdot\tilde{D}C) \tag{11}$$

Finally, at process block 528, a determinant value dS of the source matrix is computed by performing the following equation:

$$dS=dA\cdot dD+dB\cdot dC-t \tag{12}$$

Accordingly, at process block 530 (FIG. 11), the determinant residue rd is calculated as: rd=1/dS. In one embodiment, the calculation of the determinant residue is performed in accordance with FIG. 10.

Figure 15:
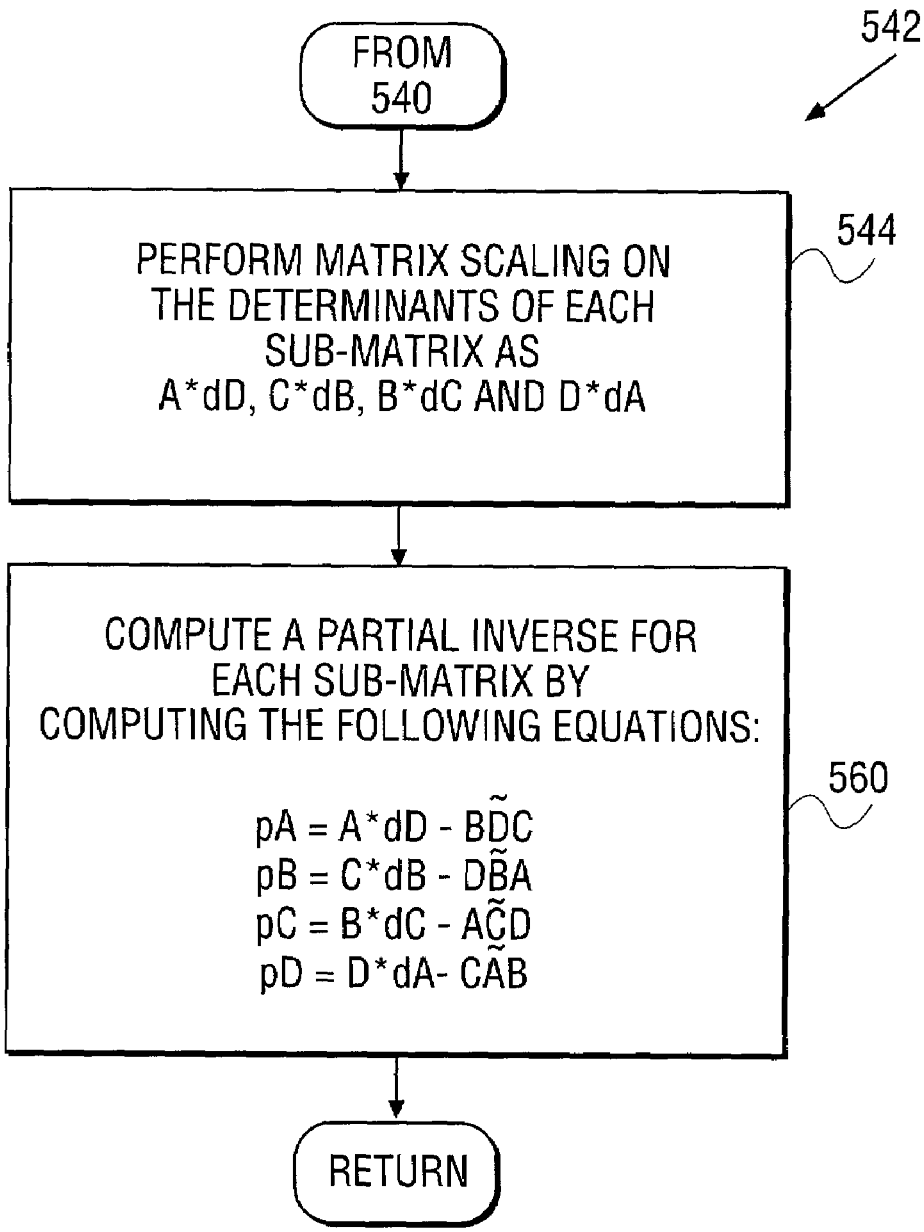
FIG. 15 depicts a flowchart illustrating an additional method for calculating a partial inverse for each sub-matrix, as depicted in FIG. 12, in accordance with a further embodiment of the present invention.

Referring now to FIG. 15, FIG. 15 depicts a flowchart illustrating an additional method 542 for calculating partial inverse for each sub-matrix of process block 540 in accordance with an embodiment of the present invention. At process block 544, a matrix scalar multiplication value of each sub-matrix determinant is computed as D*dA, C*dB, B*dC and A*dD. In one embodiment, this calculation is performed in accordance with the determinant calculation operation 400 as depicted in FIG. 5. Next, at process block 560, a partial inverse for each sub-matrix is computing using the following equations:

$$pA=A*dD-B\tilde{D}C$$

$$pB=C*dB-D\tilde{B}A$$

$$pC=B*dC-A\tilde{C}D$$

$$pD=D*dA-C\tilde{A}B \tag{13}$$

In one embodiment, those calculations are performed in accordance with the matrix scaling operation 470, as depicted in FIG. 9.

Referring now to FIG. 16, FIG. 16 depicts a flowchart 572 illustrating an additional method for calculating an inverse of the source matrix from the partial inverses, as depicted in process block 570 of FIG. 12. At process block 574, an adjoint value of each partial inverse sub-matrix is calculated as iA, iB, iC and iD by computing the following equations:

$$iA=\mathrm{adj}(pA)$$

$$iB=\mathrm{adj}(pB)$$

$$iC=\mathrm{adj}(pC)$$

$$iD=\mathrm{adj}(pD) \tag{14}$$

Once calculated, at process block 576 a final inverse value is computed according to the following equations by scaling each sub-matrix calculated at process block 574 by the determinant residue.

$$iA=iA*rd[=\mathrm{adj}(pA)*rd]$$

$$iB=iB*rd[=\mathrm{adj}(pB)*rd]$$

$$iC=iC*rd[=\mathrm{adj}(pC)*rd]$$

$$iD=iD*rd[=\mathrm{adj}(pD)*rd] \tag{15}$$

Accordingly, once the final inverse values of each sub-matrix are calculated at process block 576, the inverse of the source matrix iS is formed according to the following rule:

$$iS=\begin{pmatrix} iA & iB \\ iC & iD \end{pmatrix} \tag{16}$$

Accordingly, as in one embodiment, the calculation of the inverse of a source matrix is performed by sub-dividing the source matrix into four sub-matrices. This enables storage of each of the rows of a sub-matrix within a single SIMD register. As such, concurrent calculation of the various matrix products, determinants, scaling and residue provides improved efficiency when calculating the inverse of a source matrix. This follows due to the fact that the inverse of each sub-matrix is recombined to form the inverse of the source matrix 300 in accordance with Equation 16.

Figure 17:
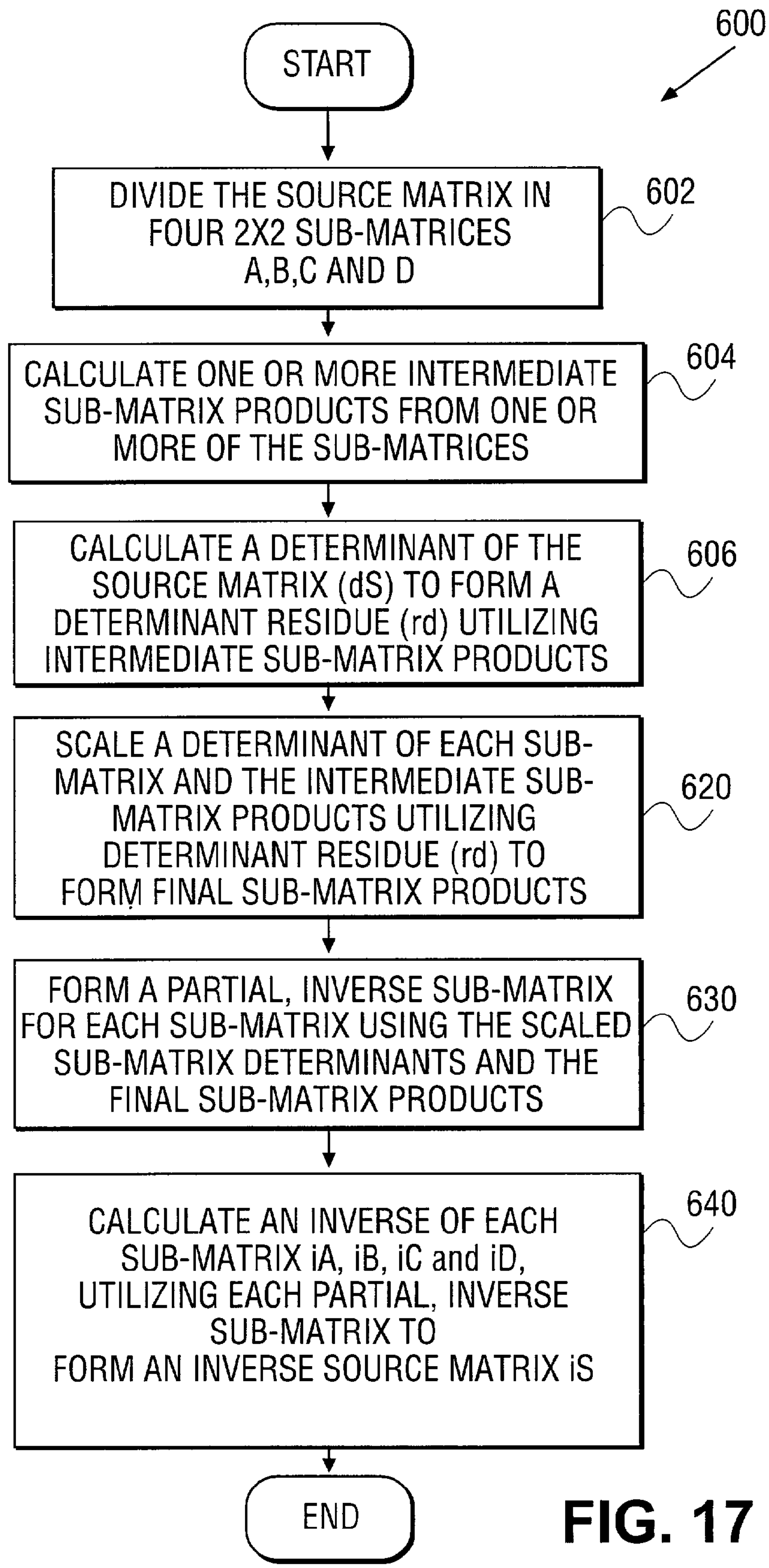
FIG. 17 depicts a flowchart illustrating an alternate method for inverting a 4×4 source matrix, in accordance with an alternate embodiment of the present invention.

The scaling of the sub-matrices in Equation 15 and process block 576 can be done in earlier stages with less operations. Referring now to FIG. 17, FIG. 17 depicts a flowchart illustrating an alternative method 600 for inverting a 4×4 matrix where scaling by the source matrix determinant residue is performed during a previous stage of the inversion process. Using this alternate method, the embodiment saves four products. However, the dependency chains for this alternative method are much tighter, usually resulting in a worsening of the computation time.

Referring now to FIG. 17, FIG. 17 depicts a method 600 illustrating an alternative source matrix inversion process in accordance with the further embodiment of the present invention. At process block 602, a source matrix 300 is divided into four 2×2 sub-matrices, A, B, C and D. Once sub-divided, one or more intermediate sub-matrix products are calculated from the sub-matrices. Next, at process block 606, a determinant of each sub-matrix is calculated as dA, dB, dC and dD. At process block 608, a determinant residue of the source matrix 300 is calculated using the intermediate sub-matrix products and the sub-matrix determinants. Once the determinant residue rd is calculated, process block 620 is performed.

At process block 620, the sub-matrix determinants and the intermediate sub-matrix products are scaled using the determinant residue to form final sub-matrix products. Next, at process block 630, a partial inverse sub-matrix is formed for each sub-matrix using the scaled sub-matrix determinants and the final sub-matrix products. Finally, at process block 640, an inverse of each sub-matrix, iA, iB, iC and iD, is calculated utilizing each partial inverse sub-matrix to form an inverse of the source matrix iS.

Figure 18:
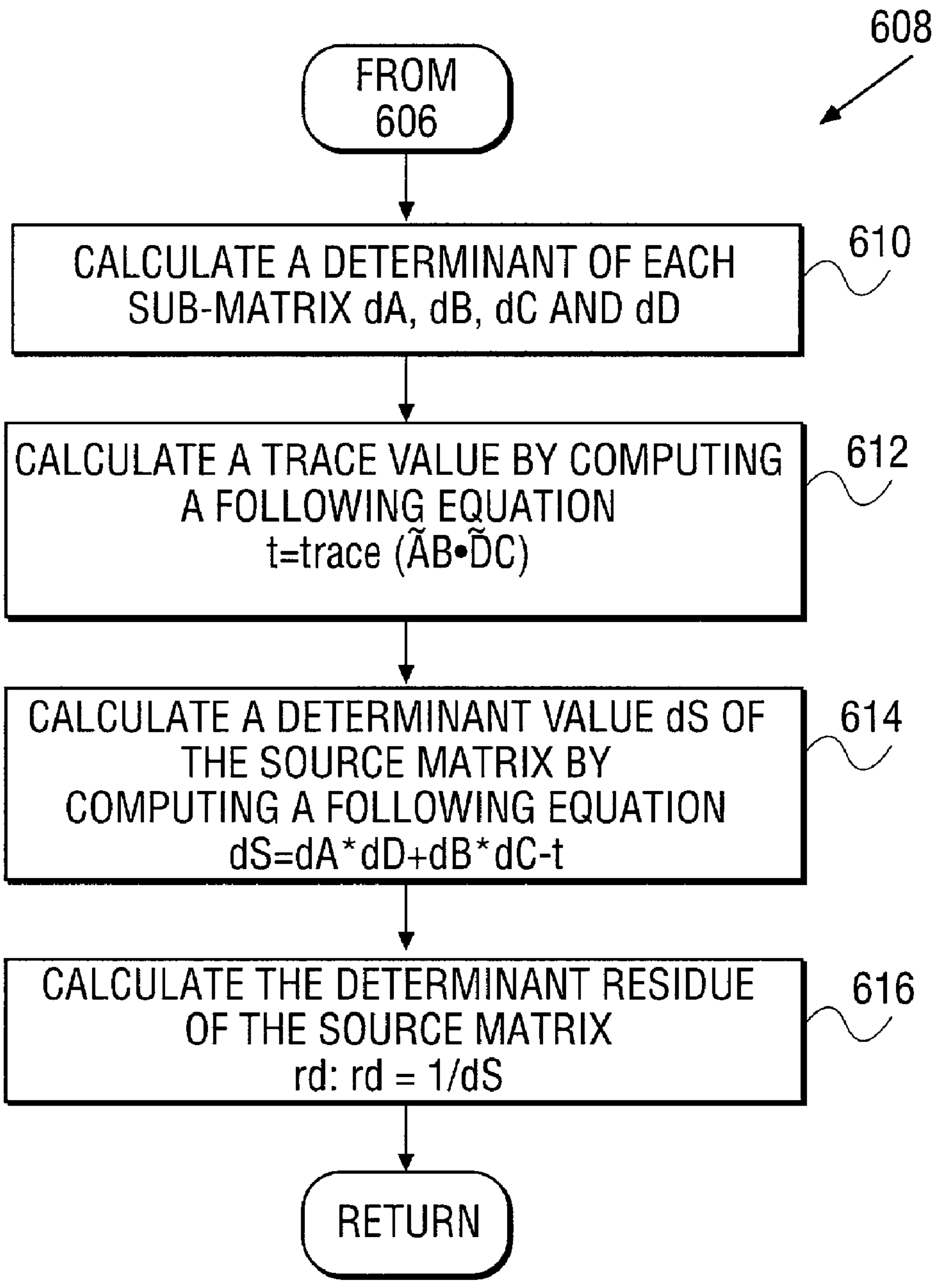
FIG. 18 depicts a flowchart illustrating an additional method for calculating a determinant residue of the source matrix, as depicted in FIG. 17, in accordance with a further embodiment of the present invention.

Referring now to FIG. 18, FIG. 18 depicts an additional method for calculating a determinant residue of the source matrix 610. At process block 612, a trace value is calculated from the intermediate sub-matrix products according to the following equation: $t=\mathrm{trace}(\tilde{A}B\cdot\tilde{D}C)$. Once the trace value is computed, at process block 614, a determinant value of the source matrix dS is computed according to the following equation: dA=dA*dD+dB*dC=t. Finally, at process block 616, the determinant residue is calculated from the determinant of the source matrix as rd=1/dS.

Figure 19:
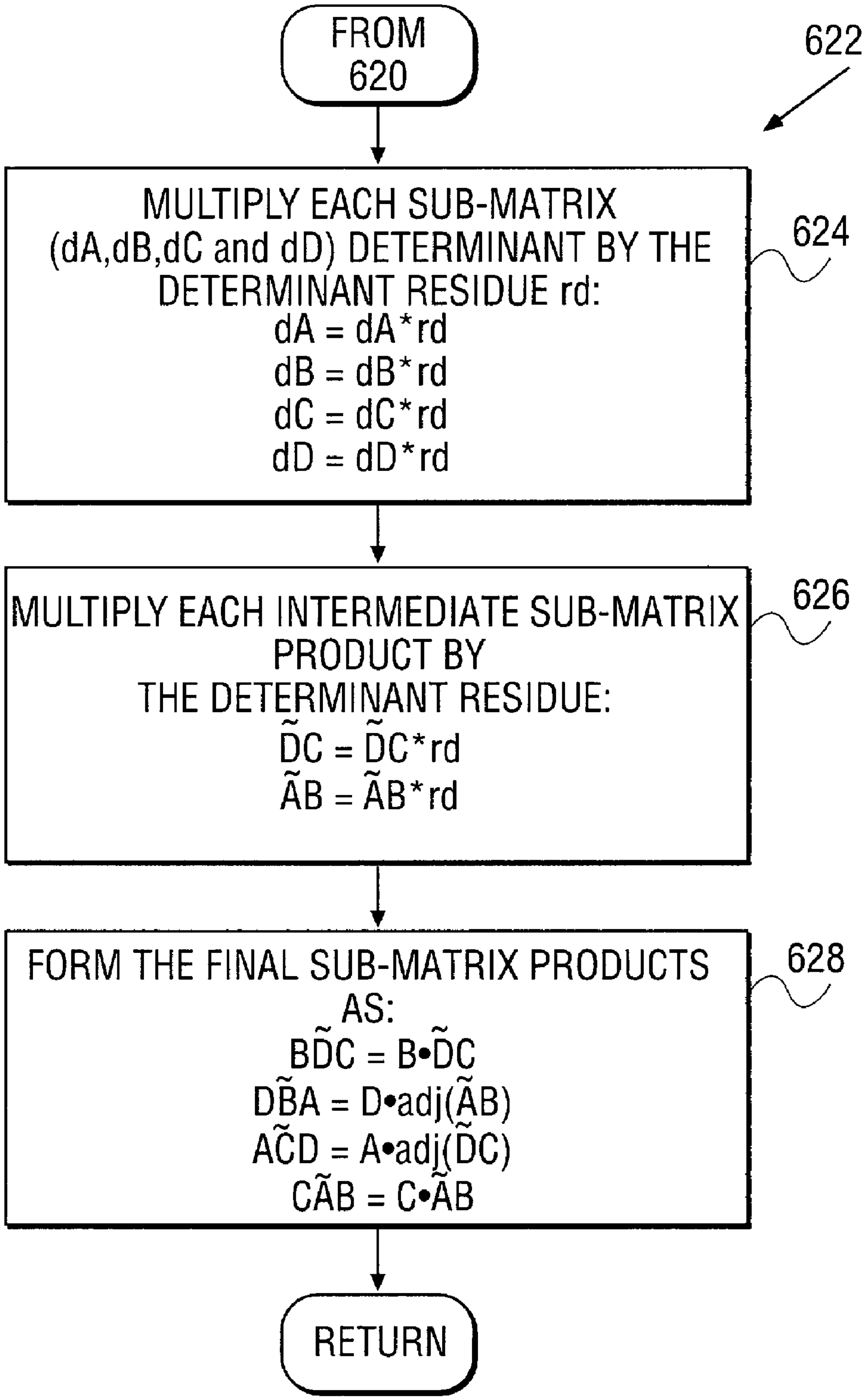
FIG. 19 depicts a flowchart illustrating an additional method for scaling sub-matrix determinants and intermediate sub-matrix products to form final sub-matrix products, as depicted in FIG. 17, in accordance with a further embodiment of the present invention.

Referring now to FIG. 19, FIG. 19 depicts an additional method 622 for scaling the sub-matrix determinants and the intermediate sub-matrix products of process block 620 to form the final sub-matrix products. At process block 624, each sub-matrix determinant is multiplied by the determinant residue rd as dA=dA*rd, dB=dB*rd, dC=dC*rd, and dD=dD*rd. Next, at process block 626, each intermediate sub-matrix product is multiplied by the determinant residue rd. Accordingly, in the embodiment described, the intermediate sub-matrix products are $\tilde{D}C$ and $\tilde{A}B$. As described above, these intermediate products can be utilized to calculate a final sub-matrix product for each sub-matrix.

Once each of the intermediate sub-matrix products is scaled by the determinant residue at process block 626, process block 628 is performed. At process block 628, the final sub-matrix products are formed according to the following equations:

$$B\tilde{D}C=B\cdot\tilde{D}C;$$

$$D\tilde{B}A=D\cdot\mathrm{adj}(\tilde{A}B);$$

$$A\tilde{C}D=A\cdot\mathrm{adj}(\tilde{D}C);\text{ and}$$

$$C\tilde{A}B=C\cdot\tilde{A}B.$$

Accordingly, in contrast to the method described with reference to FIG. 12, scaling of the intermediate sub-matrix products is performed prior to calculation of the inverse sub-matrices of process block 570, resulting in a savings of four products. However, the dependency chain for this alternate method are more tightly coupled, usually resulting in an increased computation time when compared with the method 500, as depicted with reference to FIGS. 12–16.

Figure 20:
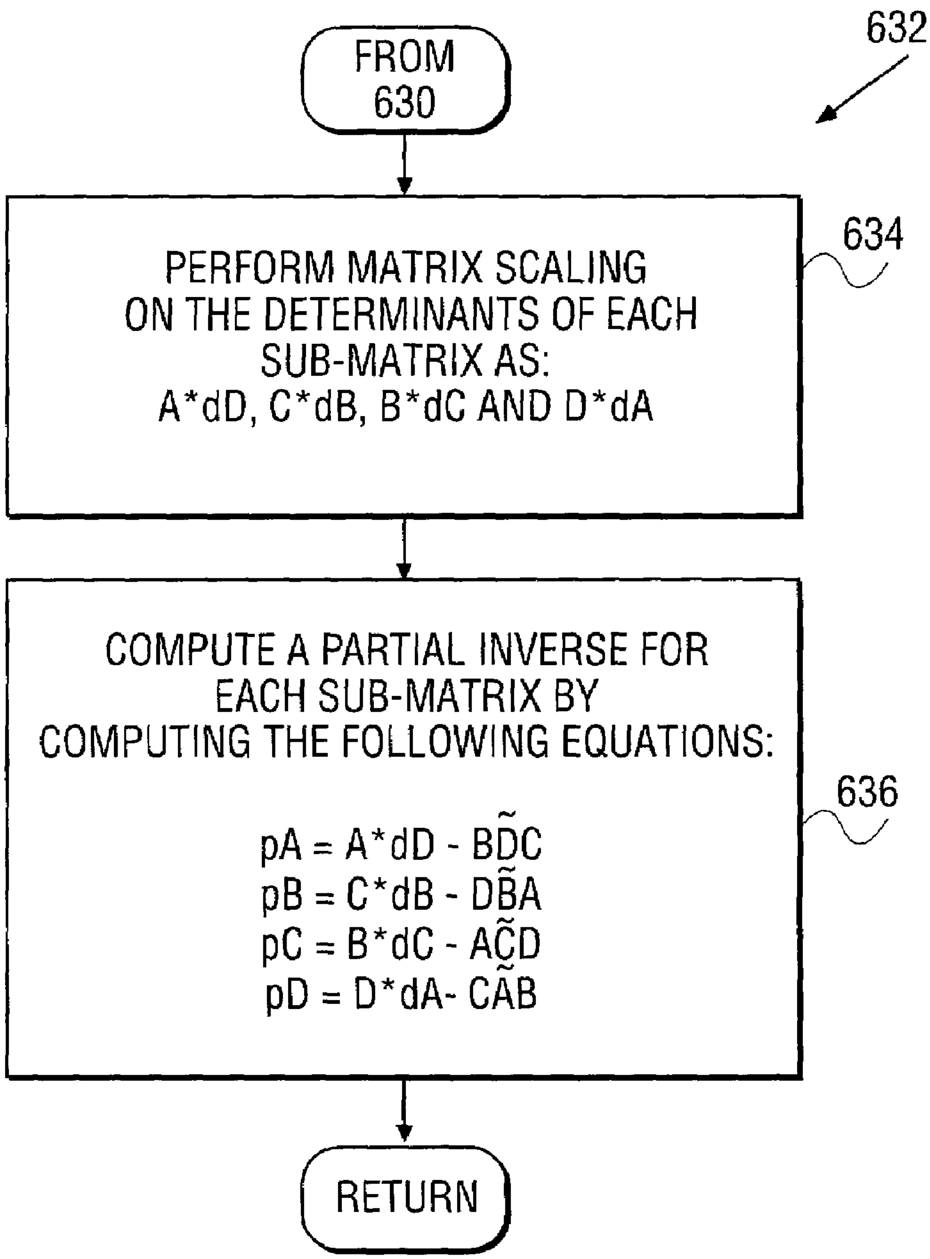
FIG. 20 depicts a flowchart illustrating an additional method for generating partial inverse sub-matrices for the sub-matrices of a source matrix, as depicted in FIG. 17, in accordance with an exemplary embodiment of the present invention.

Referring to FIG. 20, FIG. 20 depicts an additional method 630 for forming a partial inverse sub-matrix for each sub-matrix of process block 630. At process block 634, matrix scaling is performed from a determinant of each sub-matrix as A*dD, C*dB, B*dC and D*dA. Finally, at process block 636, the scalar multiplication values are scaled utilizing the final sub-matrix products to form the partial inverse sub-matrices as:

$$pA=A*dD-B\tilde{D}C$$

$$pB=C*dB-D\tilde{B}A$$

$$pC=B*dC-A\tilde{C}D$$

$$pD=D*dA-C\tilde{A}B \tag{17}$$

Figure 21:
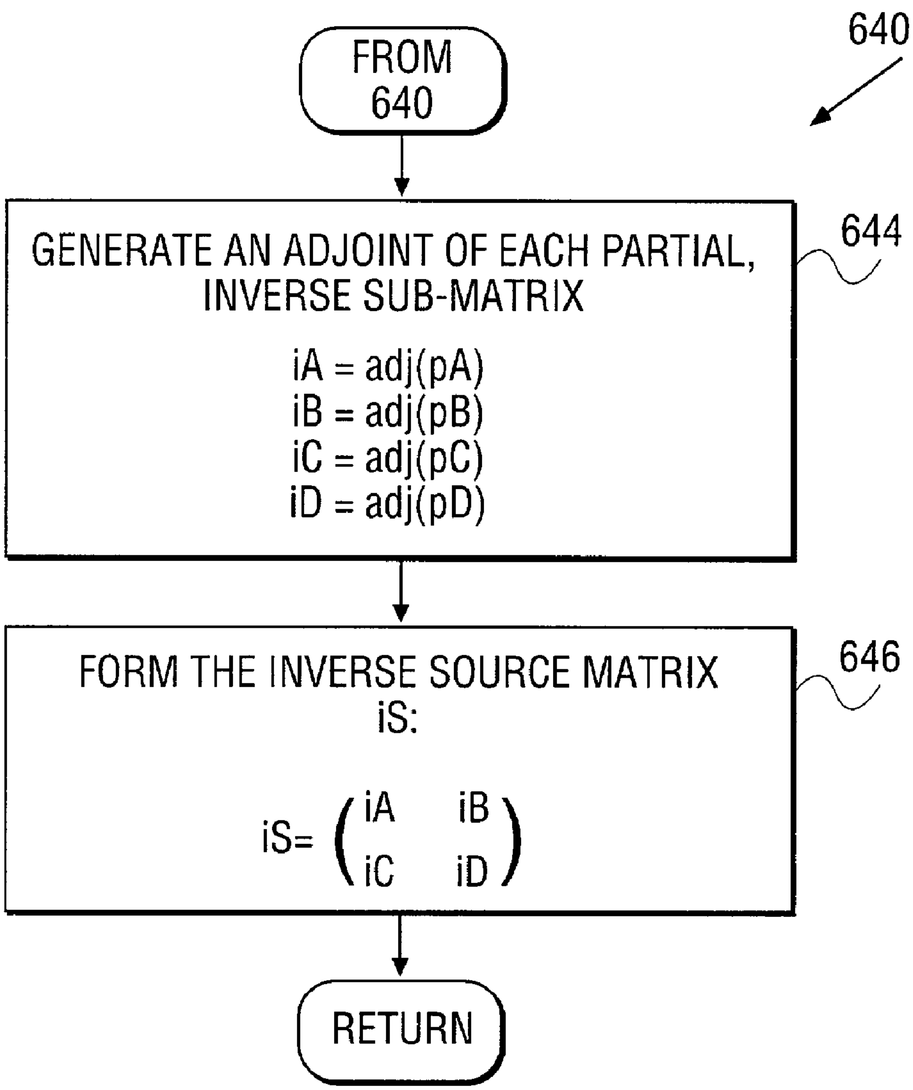
FIG. 21 depicts a flowchart illustrating an additional method for calculating a final inverse sub-matrix for each sub-matrix in order to form a final inverse source matrix, as depicted in FIG. 17, in accordance with an exemplary embodiment of the present invention.

Finally, referring to FIG. 21, FIG. 21 depicts an additional method 640 for forming an inverse of the source matrix 300 of process block 640, as depicted in FIG. 17. At process block 644, an adjoint of each partial inverse sub-matrix is calculated as depicted above with reference to Equation 14. Finally, at process block 646, the inverse source matrix is formed according to the following equation:

$$iS = \begin{pmatrix} iA & iB \\ iC & iD \end{pmatrix}.$$

Alternate Embodiments

Several embodiments of the matrix inversion process for providing vector transformations have been described. However, various implementations of the matrix inversion process provide numerous features including, complementing, supplementing, and/or replacing the features described above. Features can be implemented as part of an ALU, a programmed device, or as part of a software library in different implementations. In addition, the foregoing embodiments, for purposes of explanation, used specific nomenclature to provide a thorough understanding of the invention. However, it will be apparent to one skilled in the art that the specific details are not required in order to practice the embodiments described herein.

In addition, although an embodiment described herein is directed to software implement matrix inversion processes, it will be appreciated by those skilled in the art that the teaching of the present invention can be applied to other systems. In fact, systems for vector transformations utilizing SIMD operations are within the teachings of the present invention, without departing from the scope and spirit of the present invention. The embodiments described above were chosen and described in order to best explain the principles of the invention and its practical applications. These embodiment were chosen to thereby enable others skilled in the art to best utilize the invention and various embodiments with various modifications as are suited to the particular use contemplated.

It is to be understood that even though numerous characteristics and advantages of various embodiments have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the present invention to the full extent indicated by the broad general meaning of the terms in which the appended claims are expressed.

Having disclosed exemplary embodiments and the best mode, modifications and variations may be made to the disclosed embodiments while remaining within the scope of the invention as defined by the following claims.

What is claimed is:

1. An article comprising a machine readable medium that stores data representing a predetermined function, the predetermined function comprising:

dividing the source matrix into four 2×2 sub-matrices A, B, C and D;

calculating a plurality of sub-matrix products from the sub-matrices;

calculating a determinant of the source matrix dS to form a matrix determinant residue rd of the source matrix as rd=1/dS;

forming a partial, inverse sub-matrix of each sub-matrix using one or more of the matrix products and a determinant of each sub-matrix; and calculating an inverse of each sub-matrix iA, iB, iC, and iD, utilizing each partial, inverse sub-matrix and determinant residue rd, such that an inverse of the source matrix iS is formed.

2. The article of claim 1, wherein dividing the source matrix S into the four 2×2 sub-matrices A, B, C and D is performed according to the following rule:

$$S = \begin{pmatrix} A & B \\ C & D \end{pmatrix}$$

to enable storage of each sub-matrix within a pair of SIMD registers.

3. The article of claim 1, wherein calculating the plurality of sub-matrix products further comprises:

calculating an intermediate sub-matrix product for each sub-matrix by computing the following matrix equations:

$$\tilde{D}C = \text{adj}(D) \cdot C$$

$$\tilde{A}B = \text{adj}(A) \cdot B$$

wherein the adj function refers to an adjoint matrix operation and the dot symbol · refers to a matrix multiplication operation; and calculating a final sub-matrix product for each of the intermediate sub-matrix products by computing the following equations:

$$B\tilde{D}C = B \cdot \tilde{D}C$$

$$D\tilde{B}A = D \cdot \text{adj}(\tilde{A}B)$$

$$A\tilde{C}D = A \cdot \text{adj}(\tilde{D}C)$$

$$C\tilde{A}B = C \cdot \tilde{A}B.$$

4. The article of claim 1, wherein calculating the matrix determinant residue further comprises:

computing a determinant of each sub-matrix dA, dB, dC and dD;

calculating a trace value by computing a following equation:

$$t = \text{trace}(\tilde{A}B \cdot \tilde{D}C);$$

wherein a dot symbol · refers to a matrix multiplication operation; and calculating a determinant of the source matrix dS by computing a following equation:

$$dS = dA*dD + dB*dC - t$$

wherein the symbol * refers to a scalar multiplication operation.

5. The article of claim 1, wherein forming partial-inverse sub-matrices further comprises:

performing matrix scaling of a determinant of each sub-matrix as D*dA, C*dB, B*dC and A*dD; and computing a partial inverse for each sub-matrix according to the following matrix scaling equations:

$$pA = A*dD - B\tilde{D}C$$

$$pB = C*dB - D\tilde{B}A$$

$$pC = B*dC - A\tilde{C}D$$

$$pD = D*dA - C\tilde{A}B,$$

wherein pA, pB, pC, and pD reference partial, inverse sub-matrices, and the symbol * refers to a matrix scaling by a scalar operation.

6. The article of claim 1, wherein calculating an inverse of each sub-matrix further comprises:

calculating an adjoint value of each partial, inverse sub-matrix pA, pB, pC, and pD, according to the following rules:

$$iA=\text{adj}(pA),$$

$$iB=\text{adj}(pB),$$

$$iC=\text{adj}(pC),$$

$$iD=\text{adj}(pD),$$

wherein the adj( ) function refers to the adjoint matrix operation;

calculating a final sub-matrix inverse value according to the following equations:

$$iA=iA*rd$$

$$iB=iB*rd$$

$$iC=iC*rd$$

$$iD=iD*rd,$$

wherein the symbol * refers to a matrix scaling by a scalar operation; and forming the inverse source matrix iS according to the following rule:

$$iS=\begin{pmatrix} iA & iB \\ iC & iD \end{pmatrix}.$$

7. An article comprising a machine readable medium that stores data representing a predetermined function, the predetermined function comprising:

dividing a source matrix into four 2×2 sub-matrices, A, B, C and D;

calculating one or more intermediate sub-matrix products from one or more of the sub-matrices;

calculating a determinant of the source matrix to form a determinant residue rd utilizing the intermediate sub-matrix products;

scaling a determinant of each sub-matrix and the intermediate sub-matrix products using determinant residue rd to form final sub-matrix products;

forming a partial inverse sub-matrix pA, pB, pC and pD for each sub-matrix using the scaled sub-matrix determinants and the final sub-matrix products; and calculating an inverse of each sub-matrix iA, iB, iC and iD, utilizing each partial inverse sub-matrix to form an inverse source matrix iS.

8. The article of claim 7, wherein calculating the matrix determinant residue further comprises:

computing a determinant of each sub-matrix dA, dB, dC and dD;

calculating a trace value by computing a following equation:

$$t=\text{trace}(\tilde{A}B\cdot\tilde{D}C);$$

wherein a dot symbol · refers to a matrix multiplication operation;

calculating a determinant of the source matrix dS by computing a following equation:

$$dS=dA*dD+dB*dC-t$$

wherein the symbol * refers to a scalar multiplication operation; and calculating the determinant residue rd according to the following rule:

$$rd=1/dS.$$

9. The article of claim 7, wherein scaling by the determinant residue further comprises:

multiplying each determinant by the determinant residue rd according to the following rules:

$$dA=dA*rd$$

$$dB=dB*rd$$

$$dC=dC*rd$$

$$dD=dD*rd;$$

multiplying each intermediate sub-matrix product $\tilde{A}B$ and $\tilde{D}C$ by the determinant residue rd, according to the following equations:

$$\tilde{D}C=\tilde{D}C*rd$$

$$\tilde{A}B=\tilde{A}B*rd; \text{ and}$$

calculating a final sub-matrix product for each of the intermediate matrix products by computing the following equations:

$$B\tilde{D}C=B\cdot\tilde{D}C$$

$$D\tilde{B}A=D\cdot\text{adj}(\tilde{A}B)$$

$$A\tilde{C}D=A\cdot\text{adj}(\tilde{D}C)$$

$$C\tilde{A}B=C\cdot\tilde{A}B.$$

10. The article of claim 7, wherein calculating an inverse of each sub-matrix further comprises:

generating an adjoint of each partial, inverse sub-matrix by computing the following equations:

$$iA=\text{adj}(pA)$$

$$iB=\text{adj}(pB)$$

$$iC=\text{adj}(pC)$$

$$iD=\text{adj}(pD); \text{ and}$$

forming the inverse source matrix is according to the following rule:

$$iS=\begin{pmatrix} iA & iB \\ iC & iD \end{pmatrix}.$$

11. A computer readable storage medium including program instructions that direct a computer to function in a specified manner when executed by a processor, the program instructions comprising:

dividing the source matrix into four 2×2 sub-matrices A, B, C and D;

calculating a plurality of sub-matrix products from the sub-matrices;

calculating a determinant of the source matrix dS to form a matrix determinant residue rd of the source matrix as rd=1/dS;

forming a partial, inverse sub-matrix of each sub-matrix using one or more of the matrix products and a determinant of each sub-matrix; and calculating an inverse of each sub-matrix iA, iB, iC, and iD, utilizing each partial, inverse sub-matrix and determinant residue rd, such that an inverse of the source matrix iS is formed.

12. The computer readable storage medium of claim 11, wherein dividing the source matrix S into the four 2×2 sub-matrices A, B, C and D is performed according to the following rule:

$$S = \begin{pmatrix} A & B \\ C & D \end{pmatrix}$$

to enable storage of each sub-matrix within a pair of SIMD registers.

13. The computer readable storage medium of claim 11, wherein calculating the plurality of sub-matrix products further comprises:

calculating an intermediate sub-matrix product for each sub-matrix by computing the following matrix equations:

$$\tilde{D}C = \mathrm{adj}(\tilde{D}) \cdot C$$

$$\tilde{A}B = \mathrm{adj}(A) \cdot B$$

wherein the adj( ) function refers to an adjoint matrix operation and the dot symbol · refers to a matrix multiplication operation; and calculating a final sub-matrix product for each of the intermediate sub-matrix products by computing the following equations:

$$B\tilde{D}C = B \cdot \tilde{D}C$$

$$D\tilde{B}A = D \cdot \mathrm{adj}(\tilde{A}B)$$

$$A\tilde{C}D = A \cdot \mathrm{adj}(\tilde{D}C)$$

$$C\tilde{A}B = C \cdot \tilde{A}B.$$

14. The computer readable storage medium of claim 11, wherein calculating the matrix determinant residue further comprises:

computing a determinant of each sub-matrix dA, dB, dC and dD;

calculating a trace value by computing a following equation:

$$t = \mathrm{trace}(\tilde{A}B \cdot \tilde{D}C);$$

wherein a dot symbol · refers to a matrix multiplication operation; and calculating a determinant of the source matrix dS by computing a following equation:

$$dS = dA * dD + dB * dC - t$$

wherein the symbol * refers to a scalar multiplication operation.

15. The computer readable storage medium of claim 11, wherein forming partial-inverse sub-matrices further comprises:

performing matrix scaling of a determinant of each sub-matrix as D*dA, C*dB, B*dC and A*dD; and computing a partial inverse for each sub-matrix according to the following matrix scaling equations:

$$pA = A * dD - \tilde{B}DC$$

$$pB = C * dB - \tilde{D}BA$$

$$pC = B * dC - \tilde{A}CD$$

$$pD = D * dA - \tilde{C}AB,$$

wherein pA, pB, pC, and pD reference partial, inverse sub-matrices, and the symbol * refers to a matrix scaling by a scalar operation.

16. The computer readable storage medium of claim 11, wherein calculating an inverse of each sub-matrix further comprises:

calculating an adjoint value of each partial, inverse sub-matrix pA, pB, pC, and pD, according to the following rules:

$$iA = \mathrm{adj}(pA),$$

$$iB = \mathrm{adj}(pB),$$

$$iC = \mathrm{adj}(pC),$$

$$iD = \mathrm{adj}(pD),$$

wherein the adj( ) function refers to the adjoint matrix operation;

calculating a final sub-matrix inverse value according to the following equations:

$$iA = iA * rd$$

$$iB = iB * rd$$

$$iC = iC * rd$$

$$iD = iD * rd,$$

wherein the symbol * refers to a matrix scaling by a scalar operation; and forming the inverse source matrix iS according to the following rule:

$$iS = \begin{pmatrix} iA & iB \\ iC & iD \end{pmatrix}.$$

17. The computer readable storage medium including program instructions that direct a computer to function in a specified manner when executed by a processor, the program instructions comprising:

dividing a source matrix into four 2×2 sub-matrices, A, B, C and D;

calculating one or more intermediate sub-matrix products from one or more of the sub-matrices;

calculating a determinant of the source matrix dS to form a determinant residue rd of the source matrix utilizing the intermediate sub-matrix products and the sub-matrix determinants;

scaling a determinant of each sub-matrix and the intermediate sub-matrix products using determinant residue rd to form final sub-matrix products;

forming a partial inverse sub-matrix pA, pB, pC and pD for each sub-matrix using the scaled sub-matrix determinants and the final sub-matrix products; and calculating an inverse of each sub-matrix iA, iB, iC and iD, utilizing each partial inverse sub-matrix to form an inverse source matrix iS.

18. The computer readable storage medium of claim 17, wherein calculating the matrix determinant residue further comprises:

computing a determinant of each sub-matrix dA, dB, dC and dD;

calculating a trace value by computing a following equation:

$$t = \mathrm{trace}(\tilde{A}B \cdot \tilde{D}C);$$

wherein a dot symbol · refers to a matrix multiplication operation;

calculating a determinant of the source matrix dS by computing a following equation:

$$dS=dA*dD+dB*dC-t$$

wherein the symbol * refers to a scalar multiplication operation; and calculating the determinant residue rd according to the following rule:

$$rd=1/dS.$$

19. The computer readable storage medium of claim 17, wherein scaling by the determinant residue further comprises:

multiplying each determinant by the determinant residue rd according to the following rules:

$$dA=dA*rd$$

$$dB=dB*rd$$

$$dC=dC*rd$$

$$dD=dD*rd;$$

multiplying each intermediate sub-matrix product by the determinant residue rd, according to the following equations:

$$\tilde{D}C=\tilde{D}C*rd$$

$$\tilde{A}B=\tilde{A}B*rd; \text{ and}$$

calculating a final sub-matrix product for each of the intermediate matrix products by computing the following equations:

$$B\tilde{D}C=B\cdot\tilde{D}C$$

$$D\tilde{B}A=D\cdot\text{adj}(\tilde{A}B)$$

$$A\tilde{C}D=A\cdot\text{adj}(\tilde{D}C)$$

$$C\tilde{A}B=C\cdot\tilde{A}B.$$

20. The computer readable storage medium of claim 17, wherein calculating an inverse of each sub-matrix further comprises:

generating an adjoint of each partial, inverse sub-matrix by computing the following equations:

$$iA=\text{adj}(pA)$$

$$iB=\text{adj}(pB)$$

$$iC=\text{adj}(pC)$$

$$iD=\text{adj}(pD); \text{ and}$$

forming the inverse source matrix iS according to the following rule:

$$iS=\begin{pmatrix} iA & iB \\ iC & iD \end{pmatrix}.$$

21. An apparatus, comprising:

a processor having circuitry to execute instructions;

a plurality of SIMD data storage devices coupled to the processor, the SIMD data storage registers to pairs of floating point vectors during matrix calculation;

a storage device coupled to the processor, having sequences of instructions stored therein, which when executed by the processor cause the processor to:

divide the source matrix into four 2×2 sub-matrices A, B, C and D;

calculate a plurality of sub-matrix products from the sub-matrices;

calculate a determinant of the source matrix dS to form a determinant residue rd of the source matrix as rd=1/dS;

form a partial, inverse sub-matrix of each sub-matrix using one or more of the matrix products and the determinant of each sub-matrix; and calculate an inverse of each sub-matrix iA, iB, iC, and iD, utilizing each partial, inverse sub-matrix and determinant residue rd, such that an inverse of the source matrix iS is formed.

22. The apparatus of claim 21, wherein the instruction to calculate the plurality of sub-matrix products further causes the processor to:

calculate an intermediate sub-matrix product for each sub-matrix by computing the following matrix equations:

$$\tilde{D}C=\text{adj}(\tilde{D})\cdot C$$

$$\tilde{A}B=\text{adj}(A)\cdot B$$

wherein the adj( ) function refers to an adjoint matrix operation and the dot symbol · refers to a matrix multiplication operation; and calculate a final sub-matrix product for each of the intermediate sub-matrix products by computing the following equations:

$$B\tilde{D}C=B\cdot\tilde{D}C$$

$$D\tilde{B}A=D\cdot\text{adj}(\tilde{A}B)$$

$$A\tilde{C}D=A\cdot\text{adj}(\tilde{D}C)$$

$$C\tilde{A}B=C\cdot\tilde{A}B.$$

23. The apparatus of claim 21, wherein the instruction to calculate the matrix determinant residue further causes the processor to:

compute a determinant of each sub-matrix dA, dB, dC and dD;

calculate a trace value by computing a following equation:

$$t=\text{trace}(\tilde{A}B\cdot\tilde{D}C);$$

wherein a dot symbol · refers to a matrix multiplication operation; and calculate a determinant of the source matrix dS by computing a following equation:

$$dS=dA*dD+dB*dC-t$$

wherein the symbol * refers to a scalar multiplication operation.

24. The apparatus of claim 21, wherein the instruction to perform matrix scaling further causes the processor to:

perform matrix scaling of a determinant of each sub-matrix as D*dA, C*dB, B*dC and A*DdD;

compute a partial inverse for each sub-matrix according to the following matrix scaling equations:

$$pA=A*dD-B\tilde{D}C$$

$$pB=C*dB-D\tilde{B}A$$

$$pC=B*dC-A\tilde{C}D$$

$$pD=D*dA-C\tilde{A}B,$$

wherein pA, pB, pC, and pD reference partial, inverse sub-matrices and the symbol * refers to a matrix scaling by a scalar operation.

25. The apparatus of claim 21, wherein the instruction to calculate an inverse of each sub-matrix further causes the processor to:

calculate an adjoint value of each partial, inverse sub-matrix pA, pB, pC, and pD, according to the following rules:

$$iA=\mathrm{adj}(pA),$$

$$iB=\mathrm{adj}(pB),$$

$$iC=\mathrm{adj}(pC),$$

$$iD=\mathrm{adj}(pD),$$

wherein the adj( ) function refers to the adjoint matrix operation;

calculate a final sub-matrix inverse value according to the following equations:

$$iA=iA*rd$$

$$iB=iB*rd$$

$$iC=iC*rd$$

$$iD=iD*rd,$$

wherein the symbol * refers to a matrix scaling by a scalar operation; and form the inverse source matrix iS according to the following rule:

$$iS=\begin{pmatrix} iA & iB \\ iC & iD \end{pmatrix}.$$

26. A system, comprising:

a processor having circuitry to execute instructions;

a plurality of SIMD data storage devices coupled to the processor, the SIMD data storage registers to pairs of floating point vectors during matrix calculation;

a storage device coupled to the processor, having sequences of instructions stored therein, which when executed by the processor cause the processor to:

divide a source matrix into four 2×2 sub-matrices, A, B, C and D;

calculate one or more intermediate sub-matrix products from each of the sub-matrices, calculate a source matrix dS to form a determinant residue rd utilizing the intermediate sub-matrix products, scale a determinant of each sub-matrix and the intermediate sub-matrix products using determinant residue rd to form final sub-matrix products, form a partial inverse sub-matrix pA, pB, pC and pD for each sub-matrix using the scaled sub-matrix determinants and the final sub-matrix products, and calculate an inverse of each sub-matrix iA, iB, iC and iD, utilizing each partial inverse sub-matrix to form an inverse source matrix iS.

27. The system of claim 26, wherein the instruction to calculate the source matrix determinant residue further causes the processor to:

compute a determinant of each sub-matrix dA, dB, dC and dD;

calculate a trace value by computing a following equation:

$$t=\mathrm{trace}(\tilde{A}B\cdot\tilde{D}C)$$

wherein a dot symbol · refers to a matrix multiplication operation;

calculate a determinant of the source matrix dS by computing a following equation:

$$dS=dA*dD+dB*dC-t$$

wherein the symbol * refers to a scalar multiplication operation; and calculate the determinant residue rd according to the following rule:

$$rd=1/dS.$$

28. The system of claim 26, wherein the instruction to scale by the determinant residue further causes the processor to:

multiply each determinant by the determinant residue rd according to the following rules:

$$dA=dA*rd$$

$$dB=dB*rd$$

$$dC=dC*rd$$

$$dD=dD*rd;$$

multiply each intermediate sub-matrix product $\tilde{A}B$ and $\tilde{D}C$ by the determinant residue rd, according to the following equations:

$$\tilde{D}C=\tilde{D}C*rd$$

$$\tilde{A}B=\tilde{A}B*rd;\text{ and}$$

calculate a final sub-matrix product for each of the intermediate matrix products by computing the following equations:

$$B\tilde{D}C=B\cdot\tilde{D}C$$

$$D\tilde{B}A=D\cdot\mathrm{adj}(\tilde{A}B)$$

$$A\tilde{C}D=A\cdot\mathrm{adj}(\tilde{D}C)$$

$$C\tilde{A}B=C\cdot\tilde{A}B.$$

29. The system of claim 26, wherein the instruction to calculate an inverse of each sub-matrix further causes the processor to:

generate an adjoint of each partial, inverse sub-matrix by computing the following equations:

$$iA=\mathrm{adj}(pA)$$

$$iB=\mathrm{adj}(pB)$$

$$iC=\mathrm{adj}(pC)$$

$$iD=\mathrm{adj}(pD);\text{ and}$$

form the inverse source matrix iS according to the following rule:

$$iS=\begin{pmatrix} iA & iB \\ iC & iD \end{pmatrix}.$$

30. A method comprising:

dividing a source matrix into four 2×2 sub-matrices A, B, C and D;

storing each two element row of each 2×2 sub-matrix within a single instruction multiple data (SIMD) register;

forming a partial, inverse sub-matrix of each sub-matrix using one or more of a plurality of sub-matrix products calculated from the sub-matrices and a determinant of each sub-matrix within one or more SIMD registers; and calculating an inverse of each sub-matrix iA, iB, iC and iD, utilizing each partial, inverse sub-matrix and a determinant residue rd calculated from the source matrix, such that an inverse of the source matrix iS is formed within the one or more SIMD registers.

31. The method of claim 30, wherein forming the partial inverse sub-matrix further comprises:

calculating the plurality of sub-matrix products from the sub-matrices; and calculating the determinant of the source matrix Ds to form the matrix determinant residue rd of the source matrix as rd=1/Ds.

32. The method of claim 30, wherein dividing the source matrix S into the four 2×2 sub-matrices A, B, C and D is performed according to the following rule:

$$S = \begin{pmatrix} A & B \\ C & D \end{pmatrix}$$

to enable storage of each sub-matrix within a pair of SIMD registers.

33. The method of claim 31, wherein calculating an inverse of each sub-matrix further comprises:

calculating an adjoint value of each partial, inverse sub-matrix pA, pB, pC, and pD, according to the following rules:

$$iA=\text{adj}(pA),$$

$$iB=\text{adj}(pB),$$

$$iC=\text{adj}(pC),$$

$$iD=\text{adj}(pD),$$

wherein the adj( ) function refers to the adjoint matrix operation;

calculating a final sub-matrix inverse value according to the following equations:

$$iA=iA*rd$$

$$iB=iB*rd$$

$$iC=iC*rd$$

$$iD=iD*rd,$$

wherein the symbol * refers to a matrix scaling by a scalar operation; and form the inverse source matrix iS according to the following rule:

$$iS = \begin{pmatrix} iA & iB \\ iC & iD \end{pmatrix}.$$

* * * * *

UNITED STATES PATENT AND TRADEMARK OFFICE

CERTIFICATE OF CORRECTION

PATENT NO. : 7,003,542 B2
APPLICATION NO. : 10/038395
DATED : February 21, 2006
INVENTOR(S) : Devir It is certified that error appears in the above-identified patent and that said Letters Patent is hereby corrected as shown below:

Item (57) On The Title Page, at line 12 of the Abstract, delete “article” and insert --method--.
In column 22, at line 46, delete “is” and insert --iS--.
In column 25, at line 66, after “to” insert --store--.
In column 30, at line 26, delete “form” and insert --forming--.

Signed and Sealed this

Thirtieth Day of October, 2007

JON W. DUDAS

*Director of the United States Patent and Trademark Office*